(12) United States Patent
Kawashima et al.

(10) Patent No.: US 9,633,245 B2
(45) Date of Patent: Apr. 25, 2017

(54) OPTICAL INFORMATION READING DEVICE

(71) Applicant: OPTOELECTRONICS CO., LTD., Warabi-shi, Saitama (JP)

(72) Inventors: Yasutake Kawashima, Warabi (JP); Ken Fukuba, Warabi (JP)

(73) Assignee: OPTOELECTRONICS CO., LTD., Warabi-shi (JP)

( * ) Notice: Subject to any disclaimer, the term of this patent is extended or adjusted under 35 U.S.C. 154(b) by 0 days.

(21) Appl. No.: 14/751,333

(22) Filed: Jun. 26, 2015

(65) Prior Publication Data

US 2015/0294128 A1 Oct. 15, 2015

Related U.S. Application Data

(63) Continuation of application No. PCT/JP2013/084589, filed on Dec. 25, 2013.

(30) Foreign Application Priority Data

Dec. 27, 2012 (JP) .................................. 2012-284646

(51) Int. Cl.
*G06K 7/10* (2006.01)

(52) U.S. Cl.
CPC ..... *G06K 7/10801* (2013.01); *G06K 7/10544* (2013.01); *G06K 7/10722* (2013.01); *G06K 2207/1011* (2013.01)

(58) Field of Classification Search
CPC combination set(s) only.
See application file for complete search history.

(56) References Cited

U.S. PATENT DOCUMENTS 5,307,423 A * 4/1994 Gupta ...................... G06K 9/18
 235/379
6,118,516 A * 9/2000 Irie ...................... G03F 7/70125
 355/53

(Continued)

FOREIGN PATENT DOCUMENTS

JP 11-250172 A 9/1999
JP 2001-67432 A 3/2001

(Continued)

OTHER PUBLICATIONS

English translation of Written Opinion of the International Searching Authority dated Jan. 28, 2014, issued in counterpart Japanese Patent Application No. PCT/JP2013/084589 (3 pages).

(Continued)

*Primary Examiner* — Christle I Marshall
(74) *Attorney, Agent, or Firm* — Westerman, Hattori, Daniels & Adrian, LLP

(57) ABSTRACT

In an optical information reading device configured to read a code symbol on a subject to be read by acquiring an image of the subject to be read with an image pickup portion and analyzing the image, a laser light source and an irradiation optical system is provided as an irradiator configured to irradiate the subject to be read to form a guide mark indicating an image pickup resolution of the image pickup portion. It is preferable that the irradiator is configured to emit a plurality of radially diffused light beams so as to form the guide mark at equal intervals on the subject to be read.

9 Claims, 13 Drawing Sheets

(56) References Cited

U.S. PATENT DOCUMENTS

| | | | |
|---|---|---|---|
| 6,191,406 B1* | 2/2001 | Nelson | G06K 7/10574 250/208.1 |
| 6,340,114 B1* | 1/2002 | Correa | G06K 7/10722 235/462.01 |
| 7,389,929 B2* | 6/2008 | Havens | G06K 7/10584 235/454 |
| 8,201,740 B2* | 6/2012 | Vinogradov | G06K 7/14 235/454 |
| 2006/0038145 A1 | 2/2006 | Itou | |
| 2006/0054844 A1 | 3/2006 | Itou | |
| 2009/0084852 A1* | 4/2009 | Vinogradov | G06K 7/10792 235/462.21 |
| 2013/0229396 A1* | 9/2013 | Huebner | H04N 9/3147 345/207 |
| 2014/0008440 A1* | 1/2014 | Patil | G06K 7/10801 235/462.21 |
| 2015/0371613 A1* | 12/2015 | Patel | G06F 21/10 345/549 |

FOREIGN PATENT DOCUMENTS

| | | |
|---|---|---|
| JP | 2006-65463 A | 3/2006 |
| JP | 2006-85664 A | 3/2006 |
| JP | 2006-209208 A | 8/2006 |
| JP | 2006-330987 A | 12/2006 |

OTHER PUBLICATIONS

International Search Report dated Jan. 28, 2014, issued in corresponding application No. PCT/JP2013/084589 (1 page).

Written Opinion of the International Searching Authority dated Jan. 28, 2014, issued in corresponding application No. PCT/JP2013/084589 (3 pages).

* cited by examiner

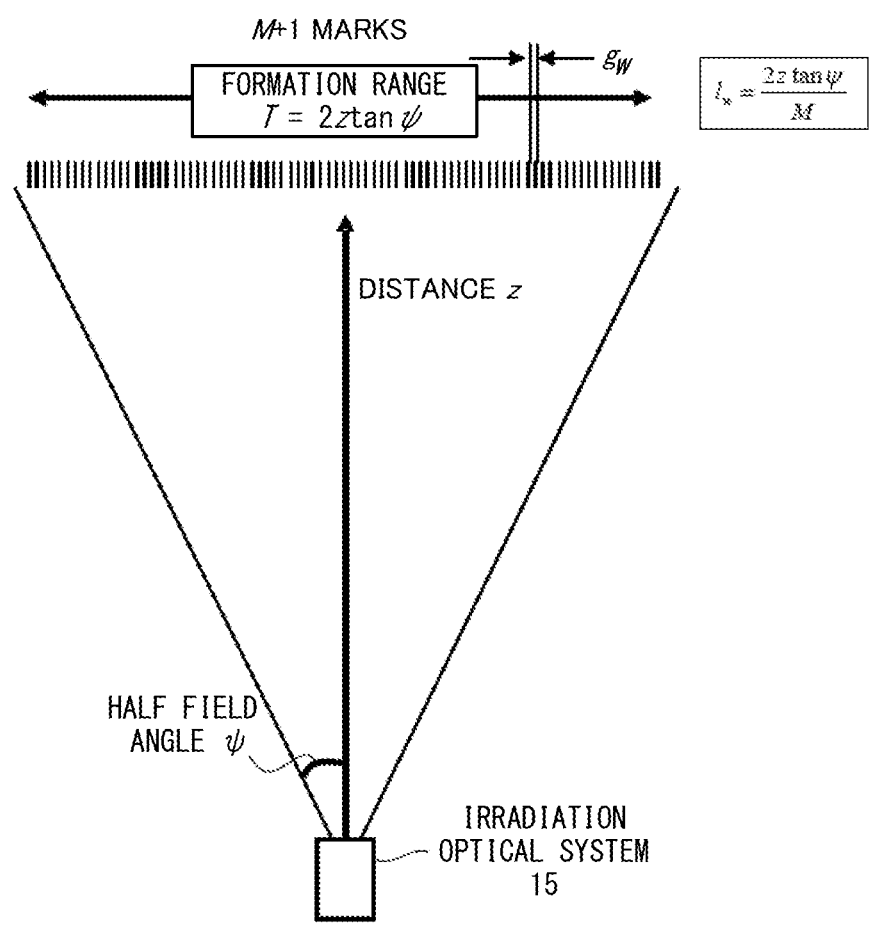

OPTICAL INFORMATION READING DEVICE

TECHNICAL FIELD

The invention relates to an optical information reading device to read optical information on a subject to be read by acquiring an image of the subject to be read with an image pickup portion and analyzing the image.

BACKGROUND ART

Conventionally, a reading device to read a code symbol such as a barcode or a two-dimensional code has been known as an optical information reading device to read optical information on a subject to be read by acquiring an image of the subject to be read with an image pickup portion and analyzing the image.

In this reading device, to facilitate aiming by a user, a mark indicating the position of image pickup with the image pickup portion is formed by irradiation on the subject to be read.

For example, as shown in FIG. 18, a reading device 200 forms a mark 201 indicating an image pickup range with the image pickup portion, a mark 202 indicating the width of the image pickup range, and a mark 203 indicating the center of the image pickup range, by light beam irradiation. The various shapes of light beams from the reading device 200 are emitted onto the subject to be read, and marks in the shapes of the beams are formed on the subject to be read. Then the user easily fits a code symbol within the image pickup range of the image pickup portion by aligning the marks with the position of the code symbol to be read, and reads the code symbol with the reading device.

This type of reading device to form the marks is disclosed in e.g. PTL1 to PTL5.

Note that in PTL5, it is described that whether or not a distance from the reading device to the subject to be read is within a range for excellent reading is automatically determined, based on whether or not a pattern drawn with the marker light on the subject to be read is blurred.

CITATION LIST

Patent Literature

{PTL1} JP 2001-67432 A
{PTL2} JP 2006-85664 A
{PTL3} JP 2006-330987 A
{PTL4} JP 2006-65463 A
{PTL5} JP 2006-209208 A

SUMMARY OF INVENTION

Technical Problem

By the way, an optical reading device has a certain distance which is appropriate for reading a code symbol. When the distance between the reading device and the code symbol is too long, the image of the code symbol is small in the acquired image, and it is impossible to discriminate the symbol. Further, when the distance is too short, the code symbol is not fitted within an image-pickup range. The range of readable distance between the reading device and the code symbol in consideration of these facts is referred to as a reading depth.

Then, when the code symbol exists outside the reading depth, even when the code symbol is fitted in the image pickup range, it is not possible to perform reading.

In this regard, it is comparatively easy to set a lower limit of the reading depth (a closer threshold value) to a considerably small value by designing of an optical system. It is expected that a user controls by eye not to move the reading device too closer to the code symbol.

However, it is difficult to perform sensory adjustment on an upper limit of the reading depth (a farther threshold value). Further, when the subject to be read is positioned far away, the area of the image pickup range is large. Accordingly, it is easy to fit the code symbol within the image pickup range even though the distance exceeds the upper limit of the reading depth. However, it is not possible to appropriately read the code symbol. The reading is repeated, and the time is wasted.

Regarding the marks in the reading device disclosed in PTL1 to PTL4, it is possible for the user to fit the code symbol within the image pickup range by referring to the mark. However, it is not possible to grasp whether or not the code symbol is within the reading depth.

Further, even when the mark disclosed in PTL5 is used, the determination as to whether or not the code symbol is within the reading depth is made with a qualitative criterion as to whether or not the mark is blurred. Even when the determination of whether or not the mark is blurred is automatically made, it is difficult to perform the determination with high accuracy using such image having a resolution generally used in the reading device. There is a problem in the accuracy.

The present invention has been made in view of this background. It has an object to enable a user to easily grasp whether or not the subject to be read is within a reading depth of an optical information reading device. In particular, it has an object to enable the user to easily grasp whether or not the subject to be read is positioned away from the reading depth.

Solution to Problem

To attain the above object, the invention is an optical information reading device configured to read optical information on a subject to be read by acquiring an image of the subject to be read with an image pickup portion and analyzing the image, including an irradiator configured to irradiate the subject to be read to form the guide mark indicating an image pickup resolution of the image pickup portion.

In the above optical information reading device, it is conceivable that the irradiator is configured to emit a plurality of radially diffused light beams so as to form a guide mark at equal intervals on the subject to be read.

Further, it is conceivable that, for k for which $10 \leq k \leq 30$ holds, an interval between adjacent guide marks among the plurality of guide marks corresponds to a resolution for k pixels of the image pickup portion.

Alternatively, it is conceivable that, assuming that r is a number equal to or greater than 1, an interval between adjacent guide marks among the plurality of guide marks is used for determination that it is possible to read the optical information when an average number of a specific type of elements in the optical information positioned between the adjacent guide marks is equal to or smaller than r. In this case, it is preferable that further $r \leq 8$ holds. Note that the above $10 \leq k \leq 30$ is a condition focusing on the interval of the guide marks itself, and the $r \leq 8$ is a condition focusing on the number of elements positioned between the adjacent guide marks. Relation between k and r varies depending on the standard or the size of the code symbol.

Further, in each of the above optical information reading devices, it is conceivable that the irradiator is configured to stop the irradiation to form the guide mark at image pickup timing by the image pickup portion.

Further, it is conceivable that the plurality of guide marks are a plurality of bar type guide marks, a plurality of dot type guide marks, or a combination of the plurality of bar type guide marks and dot type guide marks.

Further, it is conceivable that the optical information reading device further includes a determiner configured to acquire an image of the guide mark formed by the irradiator on the subject to be read, with the image pickup portion and determine whether or not reading of the optical information is possible based on a type of the optical information of a predetermined subject to be read and the number of the specific type of elements of the optical information positioned between adjacent guide marks in the acquired image.

Further, it is conceivable that the irradiator is configured to irradiate the subject to be read to form, in addition to the guide mark, a position detection mark, and the optical information reading device further includes a distance measuring portion configured to acquire an image of the position detection mark formed by the irradiator on the subject to be read, with the image pickup portion, and measure a distance from the image pickup portion to the subject to be read based on a position of the position detection mark in the acquired image.

Advantageous Effects of Invention

The optical information reading device according to the present invention enables a user to easily grasp whether or not a subject to be read is within a reading depth of the optical information reading device. In particular, it enables the user to easily grasp whether or not the subject to be read is positioned away from the reading depth.

BRIEF DESCRIPTION OF DRAWINGS

FIG. 5 is a diagram for explaining an interval between the marks when the guide mark is formed with radially irradiated light beams;

DESCRIPTION OF EMBODIMENTS

Hereinbelow, embodiments to implement the invention will be particularly described based on the drawings.

First, a code symbol reading device as an embodiment of the optical information reading device according to the present invention will be described.

Figure 1:
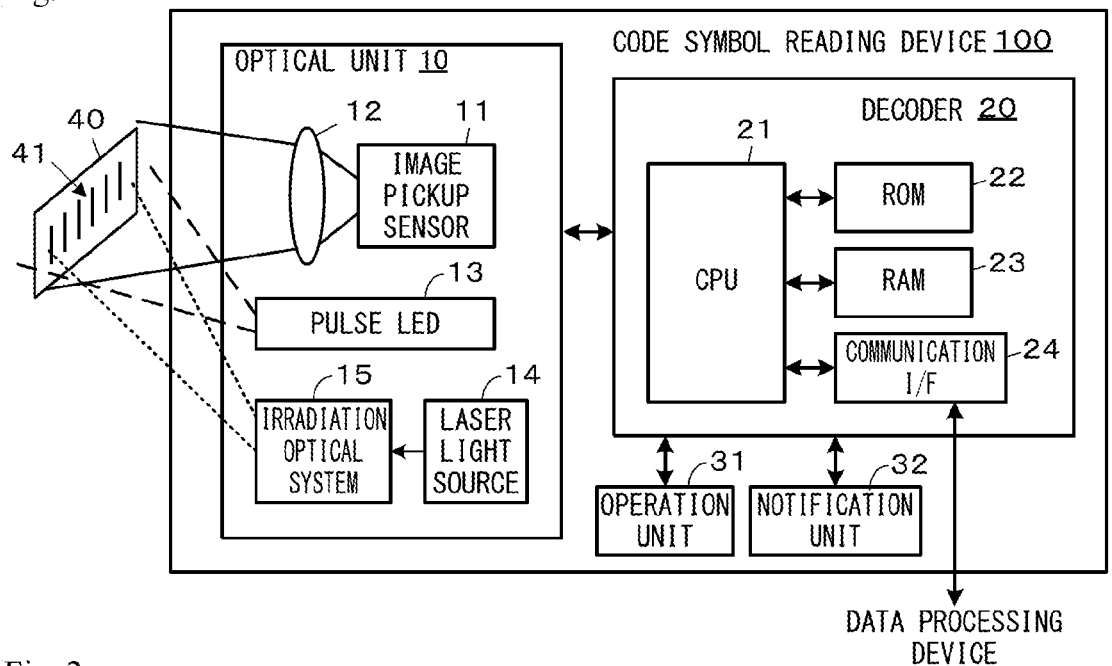
FIG. 1 is a block diagram illustrating a hardware configuration of a code symbol reading device as an embodiment of an optical information reading device according to the present invention.

FIG. 1 is a block diagram illustrating a hardware configuration of the code symbol reading device.

As shown in FIG. 1, a code symbol reading device 100 (at least an optical unit 10) is hand-held and manipulated by a user so as to read a code symbol 41, which is information indicated with a symbol having an optical reflectance different from ambient reflectance on a subject to be read 40.

The code symbol reading device 100 has the optical unit 10, a decoder 20, an operation unit 31, and a notification unit 32.

Among these units, the optical unit 10 has an image pickup sensor 11, a lens 12, a pulse LED (Light Emitting Diode) 13, a laser light source 14, and an irradiation optical system 15.

The image pickup sensor 11 is an image pickup portion for acquiring an image of the subject to be read 40. It is configured with e.g. a CMOS (Complementary Metal-Oxide Semiconductor) image sensor. Further, the image pickup sensor 11 generates image data, indicating a gradation value of each pixel based on an electric charge stored by image pickup at each pixel of the image sensor, and outputs the data to the decoder 20.

The lens 12 is an optical system to form an image with reflection light from the subject to be read 40 including the code symbol 41, on the image pickup sensor 11. The lens 12 may be configured with a single lens or may be configured with plural lenses. Further, a focal-distance adjustable lens may be used.

The pulse LED 13 is an irradiator for irradiating the subject to be read 40 as an image-pickup subject with illumination light.

The laser light source 14 and the irradiation optical system 15 are an irradiator for irradiating the subject to be read 40 as the image pickup subject with a light beam to form a guide mark indicating an image pickup resolution of the image pickup sensor 11. The laser beam outputted from the laser light source 14 which is a coherent light source is diffused with the irradiation optical system 15. Thus the light beam is emitted such that the guide mark is formed in plural positions at approximately equal intervals on the subject to be read 40. The particular configuration of these elements will be described later.

Note that when the guide mark is presented to the user, a visible light beam is used. However, when only automatic analysis to be described later is performed, an invisible light beam may be used. These light beams may be selectively used. Further, the light source is not limited to the laser light source but other light sources are available as long as a light beam is outputted.

Next, the decoder 20 has a CPU 21, a ROM 22 storing data such as a program executed by the CPU 21 and various tables, a RAM 23 used as a work area upon execution of various processing by the CPU 21, and a communication I/F 24 for communication with external devices.

As the above CPU 21, the ROM 22, and the RAM 23, an ASIC (Application Specific Integrated Circuit), a flash ROM (FROM), an SDRAM (Synchronous Dynamic Random Access Memory) and the like, may be used.

The CPU 21 executes the program stored in the ROM 22 with the RAM 23 as a work area, to control the entire operation of the code symbol reading device 100 including the optical unit 10, the operation unit 31, and the notification unit 32. Further, the CPU 21 performs decoding of the code symbol 41 based on image data of the image acquired with the image pickup sensor 11, output of the decoding result to the outside or storage, and adjustment of irradiation light quantity (or time) from the pulse LED 13.

The communication I/F 24 is an interface for communication with a data processing device such as a PC (personal computer) to process the decoding result with the decoder 20. Any arbitrary standard may be employed regardless of cable or wireless communication. Further, in the decoder 20, control parameters may be set based on data read from the communication I/F 24.

The operation unit 31 is an operation portion such as a button or a trigger for accepting the user's manipulation. In this example, it has a trigger to instruct start of reading of a code symbol.

The notification unit 32 is a notification portion for various notification to the user. As a particular notification, display of messages and data on a display unit, lighting or flashing of a lamp, sound output from a speaker, and the like are possible, but the notification is not limited to these methods. In this example, the notification unit 32 has a speaker and a lamp.

The code symbol reading device 100 described above reads the code symbol 41 by decoding the image data, acquired by image pickup on the code symbol 41 with the image pickup sensor 11, with the decoder 20.

One of the characteristic features of the code symbol reading device 100 is that the guide mark indicating the image pickup resolution of the image pickup sensor 11 is formed by irradiating the subject to be read 40. Hereinbelow, this feature will be described.

Figure 2:
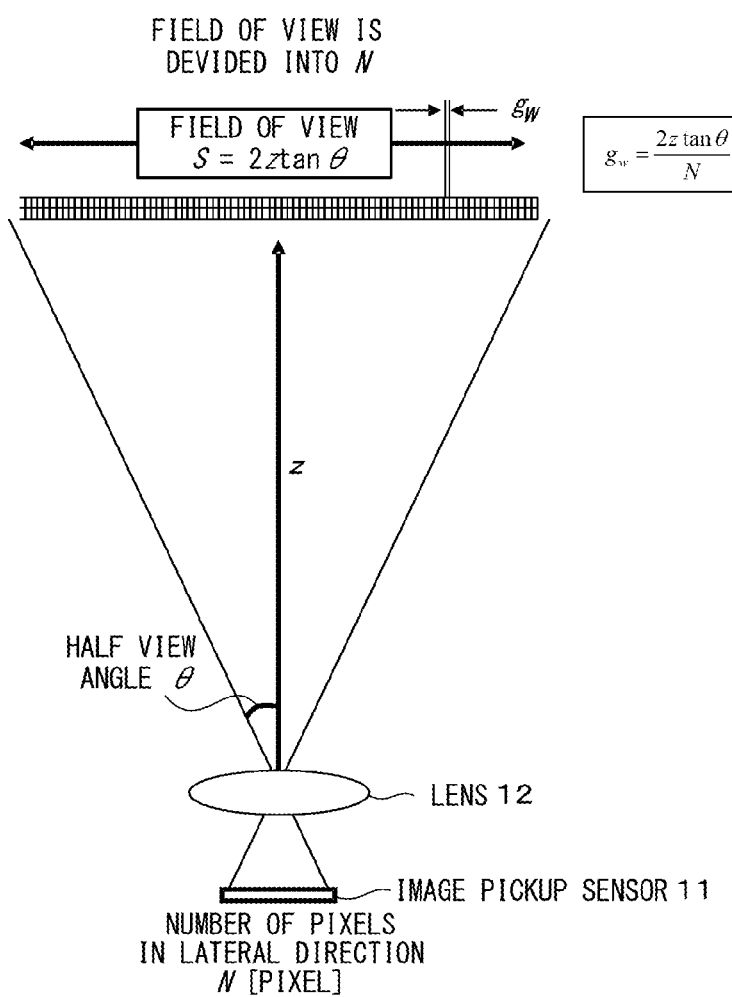
FIG. 2 is a diagram for explaining image pickup range and image pickup resolution of an image pickup sensor.

First, the image pickup range and the image pickup resolution of the image pickup sensor 11 will be described using FIG. 2.

The image pickup sensor 11 has an image pickup surface where pixels to store electric charge corresponding to photoreception quantity are arrayed in a two-dimensional matrix. As shown in FIG. 2, an image within a range at a half view angle $\theta$ determined based on the size of the image pickup surface and the characteristics of the lens 12 is acquired.

Note that assuming that the distance from the lens 12 to the subject to be read 40 is z, as a field of view S within which the subject is included in the acquired image, $S=2z \tan \theta$ holds. Assuming that the number of pixels in the lateral direction of the image pickup sensor 11 is N, the image within this field of view is acquired by N pixels. Assuming that the image pickup resolution is a width $g_w$ per pixel, $g_w=2z \tan \theta/N$ holds. Accordingly, as the distance z is prolonged, only a subject having a large width is captured as an image. That is, the image pickup resolution is lowered. When an element forming the code symbol is smaller than the $g_w$ width, the element does not appropriately appear in the acquired image.

Note that the "lateral direction" is used for the sake of convenience to designate one of the two directions of the two-dimensional matrix, and it is not related to the direction of the code symbol reading device 100 such as the horizontal direction and the vertical direction when it is used.

Figure 3:
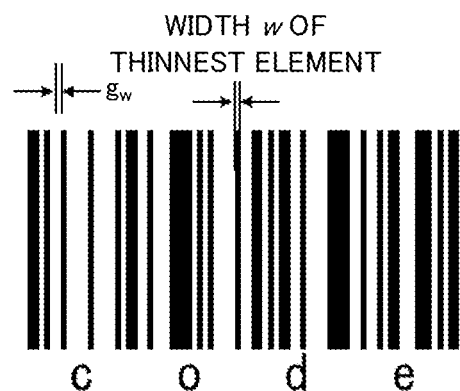
FIG. 3 is a diagram illustrating an example of a code symbol read with the code symbol reading device.

FIG. 3 illustrates a barcode as an example of the code symbol.

The barcode symbol is configured with white and black bar elements having different thickness. Among the elements, when $w<g_w$ holds as to a width w of the thinnest element (minimum element), the element does not appear in an image acquired with the image pickup sensor 11 (actually it is detected as a difference in gradation values in some cases). In this status, it is impossible to decode the barcode symbol. In contrast, when $w \geq g_w$ holds, it is possible to perform decoding.

As a threshold value, $w=g_w=2z \tan \theta/N$ holds. When this is solved for z, $$z=Nw/2 \tan \theta \quad \text{(Formula 1)}$$

holds. Note that this threshold value is a logical value. In some cases, even when the distance is shorter, it is difficult to successfully perform decoding depending on image pickup conditions such as illumination, shutter speed and ambient light. In contrast, even when the distance is longer and the element cannot be fully resolved, decoding is possible in some cases when the existence of the element is captured by the difference in gradation values.

In the present invention, the guide mark indicating the image pickup resolution is formed by irradiating the subject to be read 40, such that the user can grasp whether or not the code symbol reading device 100 is in a position to acquire a decodable image of the code symbol 41 by comparing the guide mark with the code symbol.

Figure 4A:
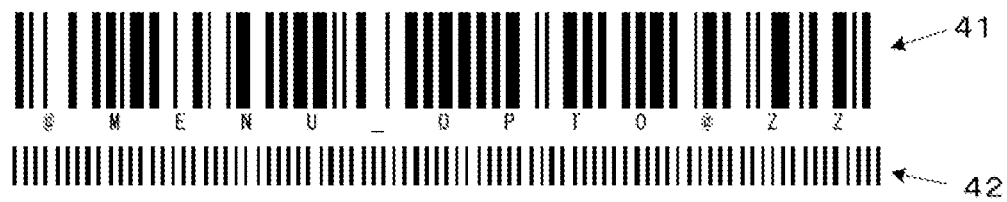
FIG. 4A is a diagram illustrating an example of guide mark.
Figure 4B:
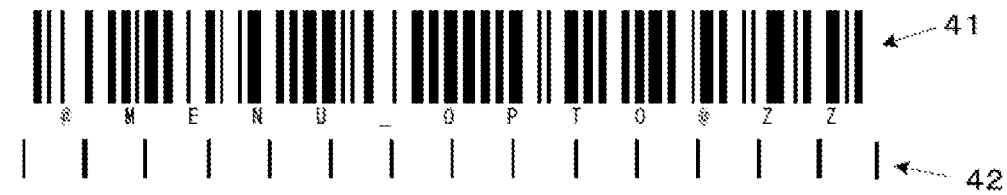
FIG. 4B is a diagram illustrating another example of the guide mark.

FIGS. 4A and 4B show examples of the guide mark.

As shown in FIG. 4A and FIG. 4B, the guide mark 42 is configured with plural marks arrayed at approximately equal intervals. Here the respective marks are bar elements, but they may be dot elements or have other shapes. Further, as it is apparent from a comparison between FIG. 4A and FIG. 4B, various intervals between the respective marks may be used.

For example, the interval between the marks may be the above-described resolution $g_w$ per pixel. However, generally the interval $g_w$ is too narrow, and it is difficult to form the separated marks. Further, it is difficult to accurately compare the marks with the elements of the code symbol by the unaided eye. Accordingly, it is desirable to set an interval wider than $g_w$.

Hereinbelow, a preferable interval between the marks will be described.

FIG. 5 is a diagram for explaining the interval between the marks when the guide mark is formed by radially irradiated light beams.

As shown in FIG. 5, the guide mark is formed by emitting plural light beams radially diffused from the irradiation optical system 15 to the subject to be read 40.

Assuming that the half field angle (half of the viewing angle) of the projection range is $\psi$, and the distance from the irradiation optical system 15 to the subject to be read 40 is z, which is the same as the distance from the lens 12 to the subject to be read 40, as a formation range T which is a range of formation of the guide mark, $T = 2z \tan \psi$ holds. When M+1 marks are formed within this range, as an interval $I_w$ between adjacent marks, $I_w = 2z \tan \psi / M$ holds.

When $I_w = g_w$ holds, the interval between adjacent marks indicates the image pickup resolution for 1 pixel.

At this time, since $$2z \tan \psi / M = 2z \tan \theta / N \quad \text{(Formula 2)}$$

holds, when it is solved for M, $$M = N \cdot \tan \theta / \tan \psi \quad \text{(Formula 3)}$$

holds. That is, as long as an appropriate value of M is determined in accordance with N, $\theta$, and $\psi$, it is possible to form the guide mark indicating the image pickup resolution of the image pickup sensor 11 on the subject to be read 40 regardless of value of the distance z.

Further, when Formula 2 is solved for $\psi$, $$\psi = \tan^{-1}(M \tan \theta / N) \quad \text{(Formula 4)}$$

holds. That is, when M has been determined previously, it is also possible to form the guide mark indicating the image pickup resolution of the image pickup sensor 11 on the subject to be read 40 by determining an appropriate value of $\psi$ in accordance with M, N, and $\theta$.

In any case, when the interval between the respective marks forming the guide mark is smaller than the width of a minimum element of a code symbol to be read, it is determined that the code symbol reading device 100 is in a position at which the code symbol reading device 100 can read the code symbol. More precisely, it is determined that the code symbol reading device 100 is not too far away from the code symbol.

Further, when $\phi = \theta$ holds, it is possible to form the guide mark in the entire area within the image pickup range in the lateral direction, and the guide mark can also be used as a mark indicating the width of the image pickup range.

However, as described above, actually it is often difficult to compare the interval between the marks with the width of the element when $I_w = g_w$ holds.

A survey has actually been performed on operators who regularly handle a reading device, and as a result, it has been found that as a desirable number of elements, $I_w \approx (10$ to $30)g_w$ (width of 10 to 30 minimum elements (=modules), and when the number is converted to the number of the thinnest black lines or white lines, the number is 5 to 15). Although actually thin lines and thick lines mixedly exist, the number of elements is averaged in some degree of width. The operator may check that the number of black lines (or white lines) of the code symbol existing within the width of several guide marks is smaller than a predetermined number.

As it is understood from the above-described Formula 1, when $$z > Nw/2 \tan \theta \quad \text{(Formula 5)}$$

holds, it is considered that the width of the minimum element of the code symbol is narrower than the image pickup range for 1 pixel of the image pickup sensor 11 and it is impossible to decode the code symbol.

When this is substituted into $I_w = 2 \tan \psi / M$, $$I_w = 2z \tan \theta / M > 2(Nw/2 \tan \theta) \tan \psi / M$$

holds. That is,

{Math. 1}

$$I_w > \frac{N \tan \psi}{M \tan \theta} w \quad \text{(Formula 6)}$$

holds.

This means that, when $$k = (N \tan \psi)/(M \tan \theta) \quad \text{(Formula 7)}$$

holds, it is impossible to decode the code symbol when $I_w > kw$ holds. That is, regarding k satisfying Formula 7, when the interval between the respective marks forming the guide mark 42 is equal to or more than k minimum elements, decoding is impossible. Further, the interval between the respective marks at this time corresponds to the resolution for k pixels of the image pickup sensor 11.

Note that in Formula 7, N and $\theta$ are determined based on the characteristics of the image pickup sensor 11 and the lens 12. M and $\psi$ can be set independently of these values. Accordingly, it may be arranged such that the value of k is previously determined in consideration of the convenience of the user's check, and then M and $\psi$ satisfying Formula 7 are determined based on the value of k, and on N and $\theta$ determined based on the characteristics of the image pickup sensor 11 and the lens 12. Note that the value of k is not limited to a natural number.

Further, when one of the values of M and $\psi$ is determined, the other value is determined. Although any one of these values may be determined first, here M is determined first, then $\psi$ is determined. In this case, the formula to obtain $\psi$ is obtained by solving Formula 7 for $\psi$ as follows.

$$\psi = \tan^{-1}(kM \tan \theta / N) \quad \text{(Formula 8)}$$

Hereinbelow, the matters desirably to be taken into consideration upon determination of these k and M will be described with a particular example.

First, regarding a minimum value of k, when $I_w = g_w$ holds, k=1 holds. However, when k has this value, the guide mark 42 is too fine. Accordingly, considering that each mark forming the guide mark 42 has some degree of width, it is difficult to grasp the interval between the respective marks forming the guide mark 42. Considering this matter, to form the guide mark 42 with which a comparison with the code symbol is easily made, it is desirable that k>3 holds. Further, the above condition $I_w \approx (10$ to $30)g_w$ corresponds to $10 \le k \le 30$.

Next, k is a value indicating a criterion that the interval between the respective marks forming the guide mark 42 corresponds to k minimum elements. However, actually, the user grasps information on the number of particular type of elements such as black elements or white elements between the marks, by comparing the guide mark 42 with the code symbol. Even when the sizes of the elements are different, the user grasps the number by color, i.e., counts the number of black bars or the number of white bars. In particular, it seems the most untroublesome for the user to count the number of elements in a color different from the background.

In consideration of these matters, r, as a criterion that r black elements exist between the respective marks forming the guide mark 42, is converted to k.

Then it is converted as, with t as a constant indicating the number of black elements averaged in the width of one minimum element, $$k = r/t \quad \text{(Formula 9)}$$

This t will be referred to as a "bar ratio", however, the form of the element is not limited to a bar.

For example, in the case of QR code (registered trademark), the sizes of elements are the same except special guide elements, and the ratio between black elements and white elements is 1:1. Accordingly, since it is considered that one black element exists in a width corresponding to two minimum elements, $t=\frac{1}{2}$ holds.

Further, in the case of barcode, although it differs in accordance with code symbol standard, main standards are as shown in the following Table 1.

case of e.g. JAN code, since one character corresponds to a width for seven modules and two black bars are included therein, $t=\frac{2}{7}$ holds.

By using the above-described t, it is easy to determine the value of k for determination of whether or not a code symbol can be decoded with reference to whether or not r or smaller number of black elements exist between the respective marks forming the guide mark 42. Note that since an average value is used as t as described above, when only one part of the guide mark 42 is checked, the criterion that r or smaller number is not appropriate in some cases. Accordingly, it is desirable to check an average number of black elements in intervals in plural positions.

Note that even when the number of white elements is counted, it is similarly possible to determine a constant corresponding to t.

Further, although the value of r can be arbitrarily determined, an experimentally obtained limit number of elements instantly discriminated by a user is about eight. Accordingly, r is desirably eight or smaller.

In the above description, the threshold value of possibility of reading is a point at which the minimum element width w coincides with the image pickup region $g_w$ for 1 pixel. However, this threshold value varies in accordance with type of code symbol. For example, in some code symbol, decoding is not performed without difficulty when the image of element is not picked up with plural pixels. Accordingly, it is desirable that when the value of k is determined, this point is taken into consideration.

Here, it is assumed that decoding can be performed when the image of a minimum element is picked up with q pixels, regarding some code symbol. In this case, given the value of k according to Formula 7 and Formula 9, the interval between the respective marks forming the guide mark 42 for

TABLE 1

|  | Thin/thick ratio | Thick black number | Thin black number | Thick white number | Thin white number | Bar ratio t Number/module | Total black bars number |
|---|---|---|---|---|---|---|---|
| industrial2of5 | 2.5 | 2 | 3 | 0 | 5 | 5/13 | inconstant |
| matrix2of5 | 2.5 | ≈1 | ≈2 | ≈1 | ≈2 | 3/9 | inconstant |
| interleaved2of5 | 2.5 | 2 | 3 | 2 | 3 | 5/16 | inconstant |
| codabar(NW-7) | 2.5 | 1 | 3 | 1 | 3 | 4/11 | inconstant |
| code39 | 2.5 | 2 | 3 | 1 | 4 | 5/14.5 | inconstant |
| code11 | 2.5 |  |  |  |  | 3/9 | inconstant |
| code93 | 2 |  |  |  |  | 3/9 | inconstant |
| code128 | 2 |  |  |  |  | 3/11 | inconstant |
| JAN | 2 |  |  |  |  | 2/7 | 30 |
| ReducedJAN | 2 |  |  |  |  | 2/7 | 22 |

For example, in the case of industrial 2 of 5 code, thick black elements (thick black), thin black elements (thin black) and thin white elements (thin white) exist in proportions of 2:3:5, and no thick white element (thick white) exists. Further, the thick element has a width 2.5 times of the thin element (minimum element=one module) regardless of color (thin/thick ratio=2.5). Accordingly, as total five thick and thin black bars exist in the width corresponding to $2.5 \times 2 + 1 \times 3 + 1 \times 5 = 13$ modules, and thus $t=\frac{5}{13}$ holds. Regarding other standards, the number of bars can be similarly calculated.

Further, in the case of multi-value code having three or more types of element widths, the number of bars can be similarly calculated. In Table 1, regarding code 11 and the subsequent codes, as the three or more element widths exist, a breakdown of each width is not given. However, in the not k but k/q minimum elements, is a threshold value for determination of possibility of decoding.

Accordingly, when the interval for k minimum elements is used as a threshold value with consideration of q, it is necessary to multiply the value of k in Formula 7 and Formula 9 by q (Formula 7 and Formula 9 are formulas in the case of q=1). That is, the value of k when q is taken into consideration is obtained from $$k = qr/t. \quad \text{(Formula 10)}$$

Of course the value of q is not necessarily an integer.

Note that the value of q varies in accordance with not only type of code symbol but also characteristics of the lens 12 or characteristics of surrounding circumstances of the code symbol reading device 100. Accordingly, it is desirable that a standard value corresponding to the type of code symbol, corrected in consideration of the characteristics of the lens 12, is calculated by experiments in advance.

Note that regarding the variation of q corresponding to the surrounding circumstances, when there is no function to change M and ψ in accordance with the variation, the variation is not reflected in the guide mark 42. Accordingly, it is preferable that a large value, in consideration of safety ratio, is set as q. This prevents erroneous determination that reading is possible when reading is impossible even when the surrounding environment has changed. Note that in this arrangement, in some cases, it is erroneously determined that reading is impossible when reading is possible. Accordingly, the value of q may be set based on which erroneous determination is more allowable. Further, it may be arranged such that the user manually adjusts the value of q.

Next, regarding the value of M, it may be determined based on the number of elements included in a code symbol assumed as a main subject to be read and the above-described r. M desirably has a value to cover the entire code symbol with the guide mark 42 within the decodable distance range. When the user compares the respective marks forming the guide mark 42 with the elements of the code symbol, a part to which attention is particularly paid differs from person to person. Accordingly, it is desirable that a comparison can be made in the entire range of the code symbol.

For example, in the case of QR code indicating a URL (Uniform Resource Locator), e>25 holds as a number e of elements arrayed in the horizontal direction. As a ratio between black elements and white elements is 1:1, assuming that r=4 holds, the mark is formed by 4/(½)=8 elements in a decodable maximum distance. Accordingly, the value of M is obtained as follows.

$$M > e/8 > 25/8 \approx 3 \quad \text{(Formula 11)}$$

In the case of QR code on a name card holding information on a company name, a department, a personal name, an electronic mail address and the like, as 40 to 70 elements are arrayed in the horizontal direction, similar calculation may be performed assuming that e=40 to 70 holds.

Further, when a number e' of black elements in the horizontal direction in the code symbol is determined as in the case of JAN code, the value of M is as follows.

$$M > e'/r \quad \text{(Expression 12)}$$

In the case of JAN code, e'=30 holds. Accordingly, M>30/4≈7 holds when r=4 holds.

Note that the interval between the marks is narrower in accordance with reduction of distance between the reading device and the code symbol. Accordingly, to cover the entire code symbol with the guide mark 42 even in an assumed decodable minimum distance, the value of M may be a multiple of a value obtained with reference to the above-described maximum distance.

Further, when the number M+1 of marks to be formed is an odd number, the mark is displayed at the central position of the guide mark 42 and the position is easily grasped. Thus it is preferable that the value of M is an even number. However, it is not an essential condition.

Since the value of M is also approximately determined in accordance with code symbol standard, as in the case of t and q, it may be stored in advance, with linkage with standard type, in the code symbol reading device 100.

Further, besides these discussions, the value of ψ may be determined first among the values of M and ψ. For example, the value of ψ is first determined based on the image pickup range of the image pickup sensor 11 or the like, and then based on the value, the value of M is determined. When it is desired to determine the guide mark is to be displayed on how large portion of the readable range, such as the entire readable range or 80% of the range, it is preferable to determine the value of φ first.

Next, particular examples of setting of the values of k and M will be described.

In any of the examples, as the number N of pixels in the horizontal direction of the image pickup sensor 11, N=752 holds, and as an angle 2θ of visibility in the horizontal direction, 2θ=40 (deg) holds.

First, an example of reading a QR code indicating a URL with the number e=25 of elements in the horizontal direction in the horizontal direction will be described. In the image pickup sensor 11, the value of q of the QR code is 2.5. Further, regarding the QR code, t=0.5 holds.

In consideration of visibility upon comparison between the guide mark and the black module, the value of r is set at r=4. A value of k found from Formula 10 is k=2.5×4/0.5=20.

Further, regarding a value of M, M>3 holds as in the case of Formula 11. Accordingly, M=4 is selected as an even number to satisfy the condition.

When the above M, N, k and θ are substituted into Formula 8, $$\psi = \tan^{-1}(20 \times 4 \times \tan 20°/752) \approx 2.21$$

holds. Accordingly, it is found that the laser light source 14 and the irradiation optical system 15 are required to be designed such that M=4 and ψ=2.21 (deg) hold.

Next, an example of reading a JAN code will be described. In the above image pickup sensor 11, the value of q of JAN code is 1.25. Further, regarding JAN code, t=2/7 holds as shown in Table 1.

As in the above case, the value of r is set at r=4, as a value of k, k=1.25×4/(2/7)=17.5 holds. Further, a value of M obtained from Formula 12 is M>30/4≈7. Accordingly, as an even number to satisfy this condition, M=8 is selected.

When the above M, N, k, and θ are substituted into Formula 8, $$\psi = \tan^{-1}(17.5 \times 8 \times \tan 20°/752) \approx 3.88$$

holds. Accordingly, it is found that the laser light source 14 and the irradiation optical system 15 are required to be designed such that M=8 and ψ=3.88 (deg) hold.

In the case of reduced JAN code in the same condition, a number e' of black elements in the horizontal direction is e'=22. Accordingly, as M>22/4≈5 holds, M=6 is selected as an even number to satisfy the condition. Also regarding the reduced JAN code, t=2/7 holds as shown in Table 1, and assuming that q is 1.25 which is same as the above, the value of k is 17.5 as in the case of the above-described JAN code. Accordingly, $$\psi = \tan^{-1}(17.5 \times 8 \times \tan 20°/752) \approx 2.91$$

holds. Accordingly, it is found that the laser light source 14 and the irradiation optical system 15 are required to be designed such that M=6 and ψ=2.91 (deg) hold.

In the above description, the determination of the values of k and M has been explained on the assumption that there is one standard regarding the code symbol to be read. However, it is possible to determine the value of k (and the value of M) on the assumption that codes of plural types of standards are to be read. Next, this matter will be described.

First, regarding code symbol of some standard, the value of k is determined by some appropriate method. When the value of k is not changed, regarding code symbol of another particular standard, the number r' of black elements between the respective marks forming the guide mark 42 in a decoding limit distance is obtained from Formula 10 as $$r'=k \times t/q. \qquad \text{(Formula 13)}$$

For example, assuming that k=17.5 holds as in the case of reading the above JAN code, and q=0.97 and t=⅗ hold regarding code symbol of said another particular standard, r'=17.5×(⅗)/0.97=6.01 holds regarding the code symbol. Accordingly, it is determined whether decoding is possible or not based on whether about six or more black elements exist between the respective marks.

However, as described above, it is difficult for the user to instantly count black elements more than five. Accordingly, it is desirable that the value of k is set such that r' is equal to or less than five (equal to or less than a predetermined threshold value) regarding code symbols of all the types of standards assumed to be read.

On the other hand, in Formula 13, t/q is a constant determined in correspondence with type of code symbol and characteristics of the lens 12. Accordingly, it is conceivable that the values of t and q are obtained with regard to all the types of standards assumed to be read, and then the value of k is determined such that r' is five (predetermined threshold value) regarding a standard for which t/q is maximum (q/t is minimum).

Table 2 shows an example of q/t values for the various code symbols. In Table 2, the minimum q/t value is 2.32 for code 39. When the value of k is obtained with the condition r=5, k=2.32×5=11.6 holds from Formula 10.

TABLE 2

| | Thin/thick ratio | 1/t | q | q/t | r' |
|---|---|---|---|---|---|
| industrial2of 5 | 2.5 | 2.6 | 1.1 | 2.86 | 4.055944 |
| matrix2of5 | 2.5 | 3 | 1.1 | 3.3 | 3.515152 |
| interleaved2of5 | 2.5 | 3.2 | 1.1 | 3.52 | 3.295455 |
| codabar(NW-7) | 2.5 | 2.8 | 1.1 | 3.025 | 3.834711 |
| code39 | 2.5 | 2.9 | 0.8 | 2.32 | 5 |
| code11 | 2.5 | 3 | 1.1 | 3.3 | 3.515152 |
| code93 | 2 | 3 | 1.3 | 3.9 | 2.974359 |
| code128 | 2 | 3.7 | 1.3 | 4.766667 | 2.433566 |
| JAN | 2 | 3.5 | 1.3 | 4.55 | 2.549451 |
| Reduced JAN | 2 | 3.5 | 1.3 | 4.55 | 2.549451 |
| 2 dimensional code | | 2 | 2.5 | 5 | 2.32 |

In Table 2, the r' column shows r' values regarding the code symbols of respective standards obtained based on the value, k=11.6. In accordance with these values, it is understood that the number of black elements between the respective marks forming the guide mark 42, to be counted for determination of possibility of decoding, is five or smaller in each standard.

In this manner, it is possible to form the guide mark 42 so as to easily determine possibility of decoding even when there are code symbols of plural standards assumed to be read.

Next, the configuration of the above-described optical system to form the guide mark will be described.

Figure 6:
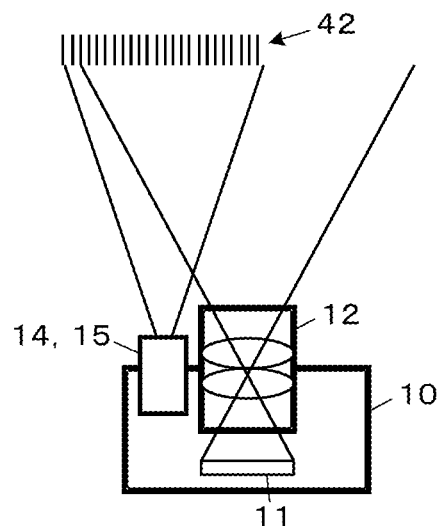
FIG. 6 is a diagram schematically illustrating arrangement of an optical system to form the guide mark, in the optical information reading device shown in FIG. 1.

FIG. 6 schematically shows the arrangement of the optical system.

As shown in FIG. 6, the laser light source 14 and the irradiation optical system 15, as the optical system to form the guide mark, form the guide mark 42 on the subject to be read 40 by emitting plural light beams radially diffused from, as a center, an optical axis approximately parallel with the optical axis of the lens 12.

Figure 7:
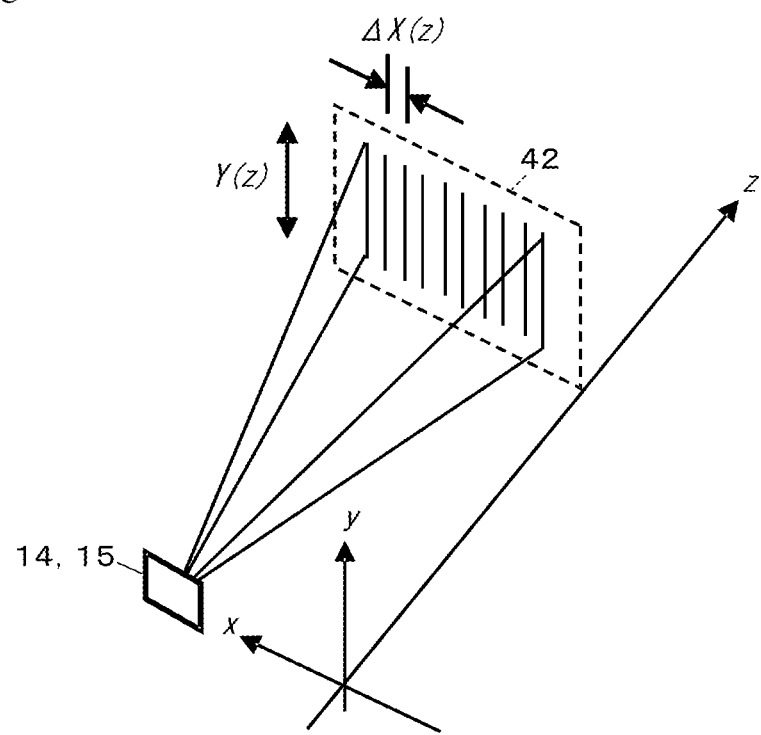
FIG. 7 is a diagram for explaining the size of the guide mark.

FIG. 7 shows the size of the guide mark to be formed.

In FIG. 7, the x-axis indicates a lateral direction of pixel matrix in the image pickup sensor 11; the y-axis, a vertical direction; and the z-axis, the optical axis direction of the lens 12 (when the direction of light passing through the optical axis is changed with a mirror or the like, the z-axis is set along the optical path through the optical axis).

Since the beam to form the guide mark is radially diffused as shown in FIG. 6, the size of the mark differs in accordance with position in the z-axis direction. However, the mark has a size proportional to the distance in the z-axis direction from the irradiation optical system 15.

The laser light source 14 and the irradiation optical system 15 form the guide mark on the subject to be read 40 with their output light beam in accordance with the distance z in the z-axis direction to the subject to be read 40 such that the interval between adjacent marks is ΔX(z) and the size in the y-axis direction is Y(z).

Figure 8A:
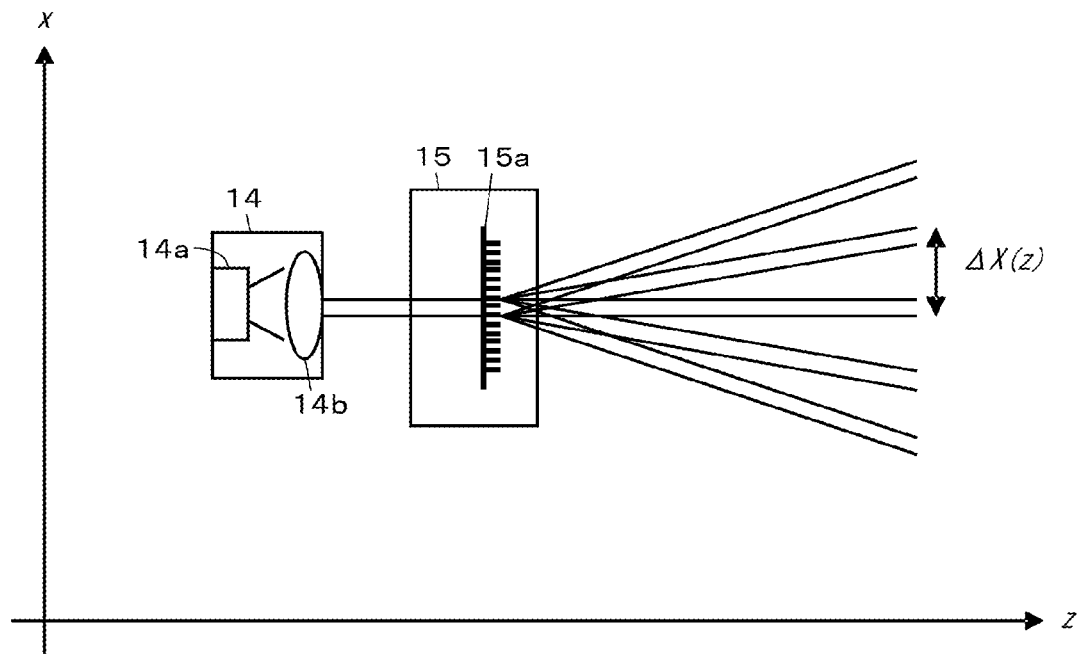
FIG. 8A is a diagram illustrating a cross section of a first example of the configuration of the optical system to form the guide mark.

FIG. 8A to FIG. 12C show other examples of the optical system adoptable as the laser light source 14 and the irradiation optical system 15. FIG. 8A to FIG. 12C schematically show a cross section of the laser beam outputted from the laser light source 14 in a position of the optical axis. FIG. 8A and the like show a cross section in a plane parallel with the xz plane in FIG. 7; FIG. 8B and the like, a cross section in a plane parallel with the yz plane in FIG. 7. That is, the figures with A-added numbers show the expansion of the guide mark in the x-axis direction, while the figures with B-added numbers show the expansion of the guide mark in the y-axis direction.

Figure 8B:
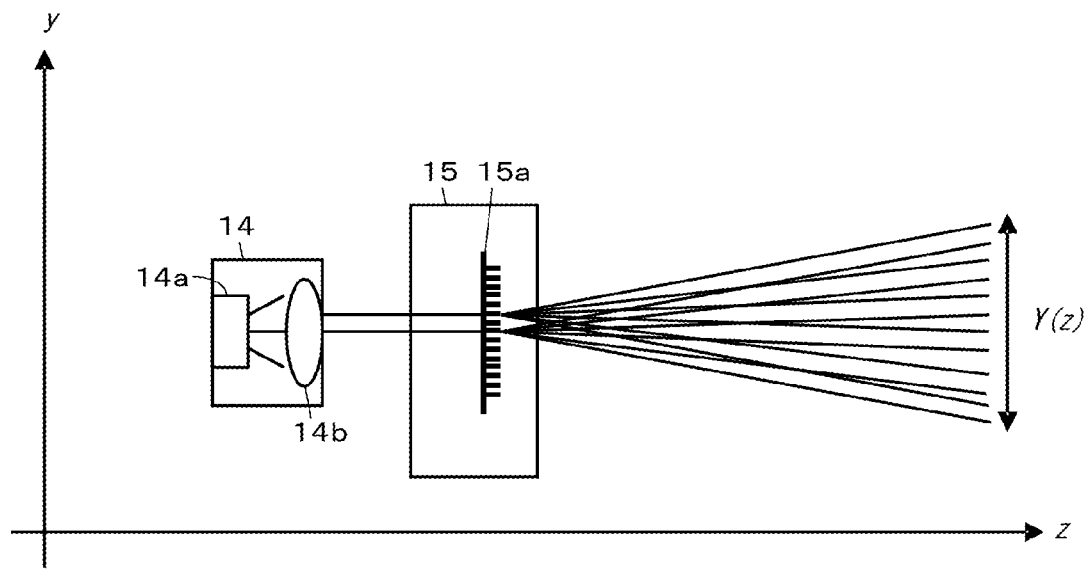
FIG. 8B is a diagram illustrating another cross section of the configuration of the optical system.

First, in the first example shown in FIG. 8A and FIG. 8B, the laser light source 14 has a laser device 14a and a collimating lens 14b. The irradiation optical system 15 has a diffraction optical element 15a.

The laser beam outputted from the laser device 14a is outputted, through the collimating lens 14b and an unshown aperture, as a thin collimated laser beam, from the laser light source 14, and the light enters the diffraction optical element 15a.

Further, the diffraction optical element 15a has a diffracting characteristic to form a point image string, neighboring point images being a distance ΔX(z) away from each other in the x-axis direction, and to form a point image string looking like unseparated to the naked eyes along a length y(z) in the y-axis direction.

Accordingly, the guide mark 42 as shown in FIG. 7 is formed by letting the laser beam outputted from the laser light source 14 pass through the diffraction optical element 15a.

Figure 9A:
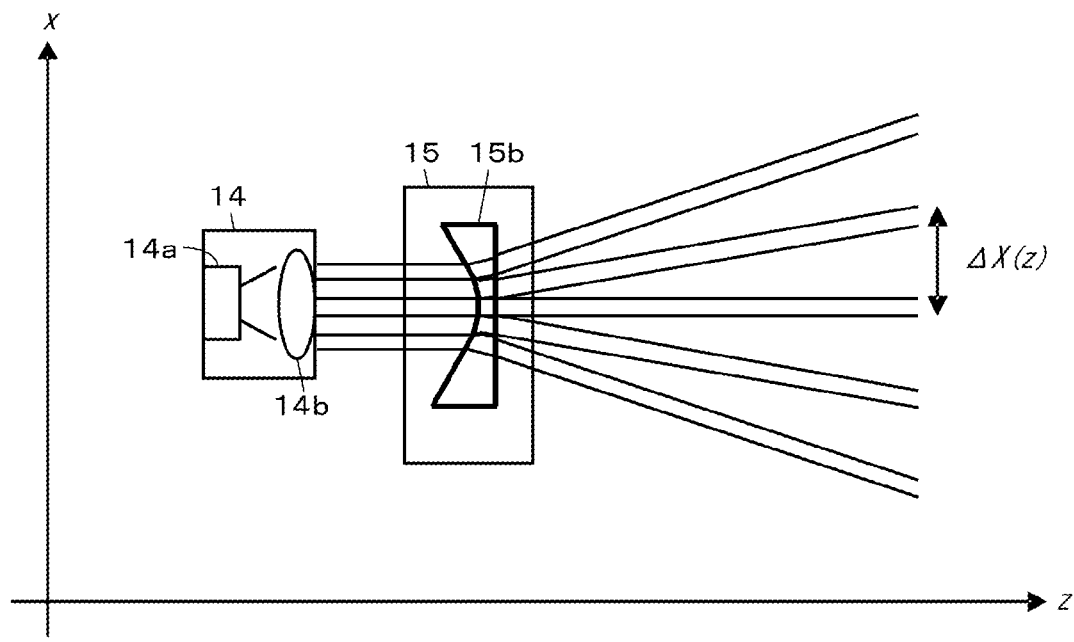
FIG. 9A is a diagram illustrating a cross section of a second example of the configuration of the optical system to form the guide mark.
Figure 9B:
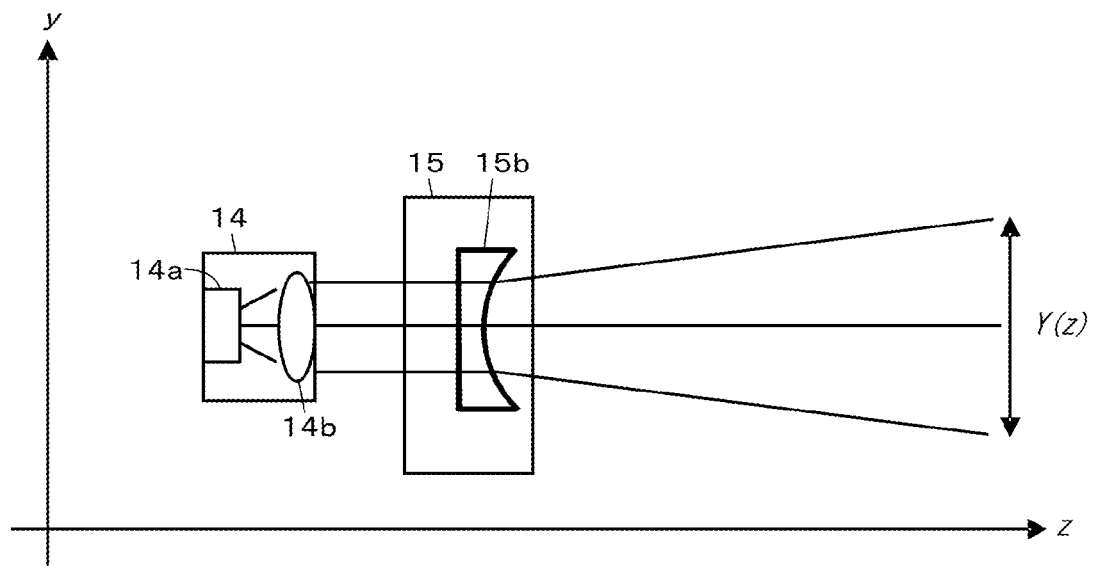
FIG. 9B is a diagram illustrating another cross section of the configuration of the optical system.

Next, in the second example shown in FIG. 9A and FIG. 9B, the structure of the laser light source 14 is basically the same as that in the first example, except that the opening diameter of the aperture is greater than that in the first example, and the diameter of the outputted laser beam is greater than that in the first example.

The irradiation optical system 15 has a refractive optical element 15b. In the cross section shown in FIG. 9A, the refractive optical element 15b has an incidence surface with discontinuous angles. Accordingly, the laser beam outputted from the laser light source 14 is refracted in different directions in correspondence with incident position, and outputted as divided laser beams. The respective angles of the incidence surface are set so as to form spots at the interval ΔX(z) by the divided laser beams.

On the other hand, in the cross section shown in FIG. 9B, the refractive optical element 15b is a concave lens having a smooth concave surface to give the laser beam a divergent angle of a width Y(z).

The above incidence surface with discontinuous angles and the smooth concave surface are preferably formed on different surfaces of the refractive optical element 15b, respectively. With this structure, it is possible to form the guide mark 42 as shown in FIG. 7.

Figure 10A:
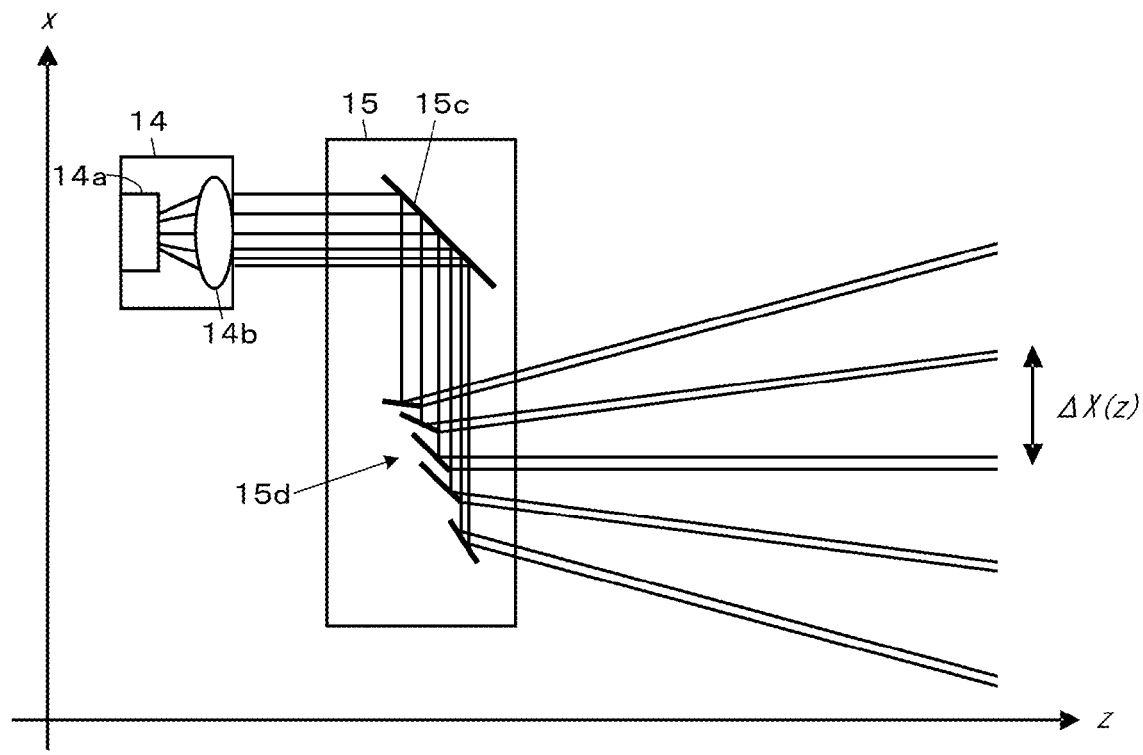
FIG. 10A is a diagram illustrating a cross section of a third example of the configuration of the optical system to form the guide mark.
Figure 10B:
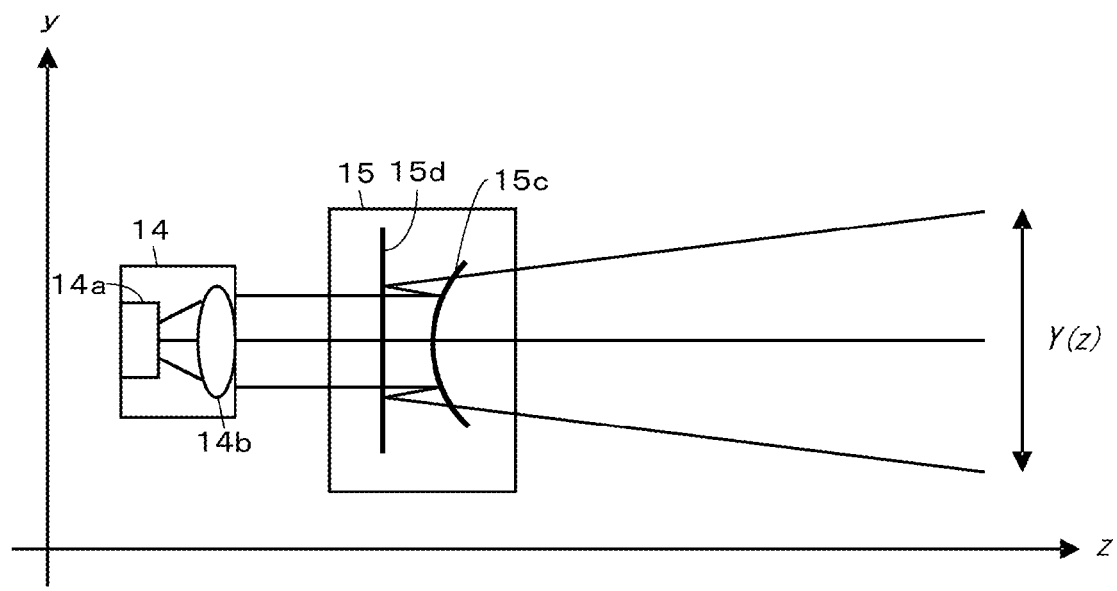
FIG. 10B is a diagram illustrating another cross section of the configuration of the optical system.

Next, in the third example shown in FIG. 10A and FIG. 10B, the structure of the laser light source 14 is the same as that in the second example. The irradiation optical system 15 has a concave mirror 15c and a mirror group 15d.

The concave mirror 15c provides the laser beam outputted from the laser light source 14 with a y-axis direction divergent angle. The mirror group 15d has plural mirrors respectively directed at different angles. The mirrors reflect the laser beam reflected from the concave mirror 15c to respectively different directions. Further, the angles of the respective mirrors are set so as to form spots at the intervals of $\Delta X(z)$ with the reflected laser beam.

It is also possible to form the guide mark 42 as shown in FIG. 7 with the above-described optical system.

Figure 11A:
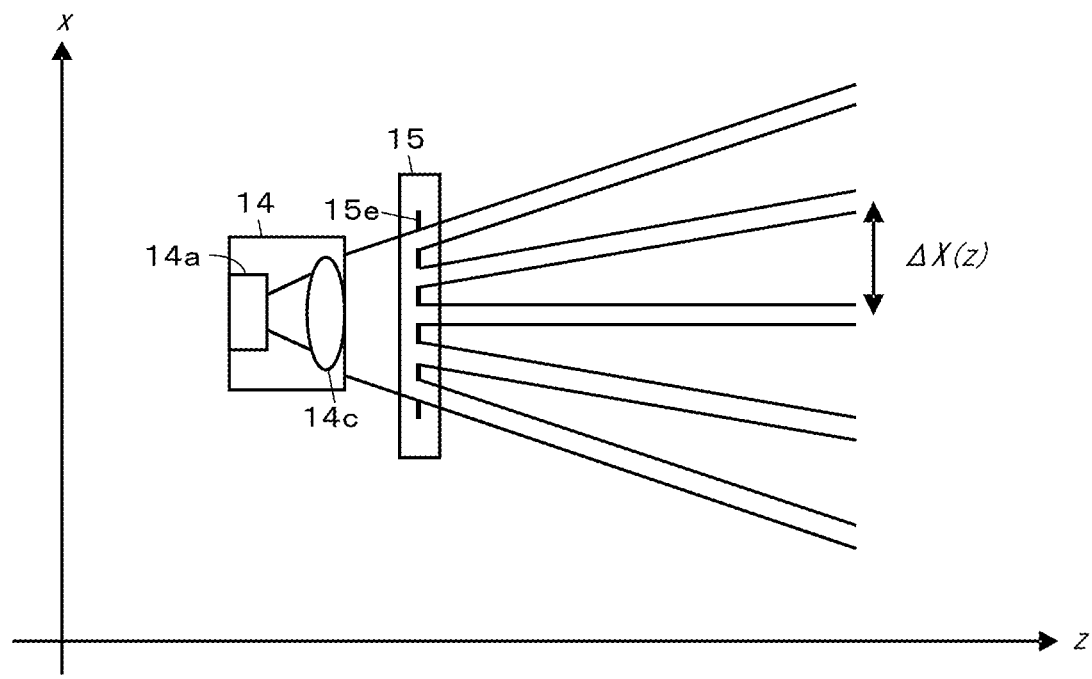
FIG. 11A is a diagram illustrating a cross section of a fourth example of the configuration of the optical system to form the guide mark.
Figure 11B:
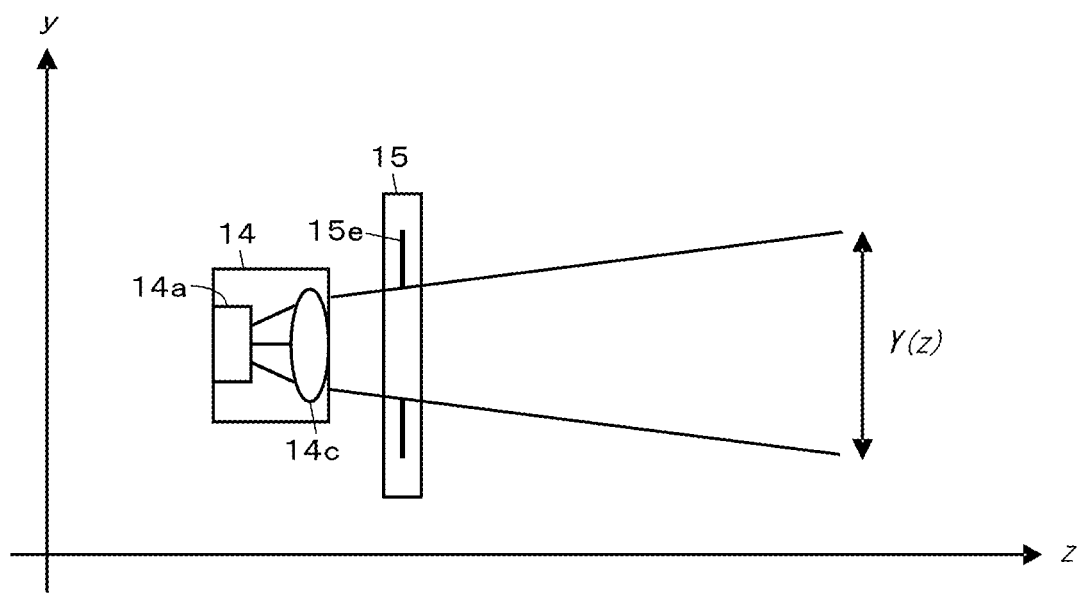
FIG. 11B is a diagram illustrating another cross section of the configuration of the optical system.

Next, in the fourth example shown in FIG. 11A and FIG. 11B, the laser light source 14 has a laser device 14a and a lens 14c. The laser device 14a is the same as that in the first to third examples. The lens 14c outputs the laser beam, outputted from the laser device 14a, with a predetermined divergent angle.

Further, the irradiation optical system 15 has a light shielding plate 15e with plural slits. The slit has a rectangular shape with x-axis direction shorter sides and y-axis direction longer sides. When the laser beam outputted from the lens 14c, having a divergent angle, passes through the slits of the light shielding plate 15e, it advances in different directions in correspondence with passing positions. Further, spots are formed in a rectangular shape along the y-axis direction corresponding to the shape of the slits. It is possible to form the guide mark 42 as shown in FIG. 7 with the above-described optical system by cutting the slits such that the interval between the spots becomes $\Delta X(z)$ and the longer side thereof becomes $y(z)$.

Figure 12A:
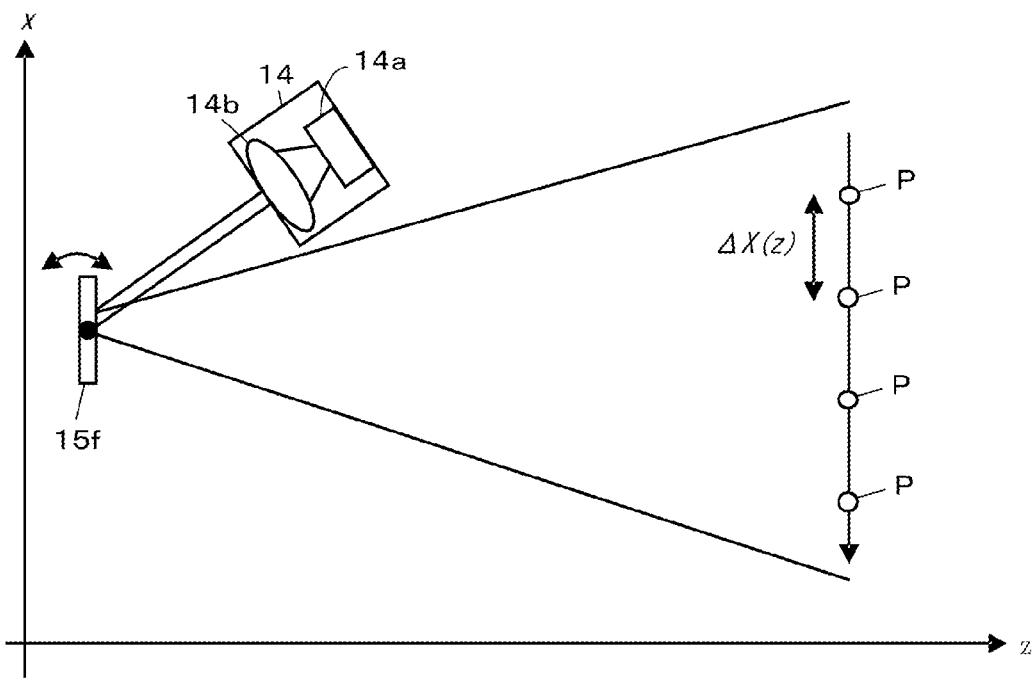
FIG. 12A is a diagram illustrating a cross section of a fifth example of the configuration of the optical system to form the guide mark.
Figure 12B:
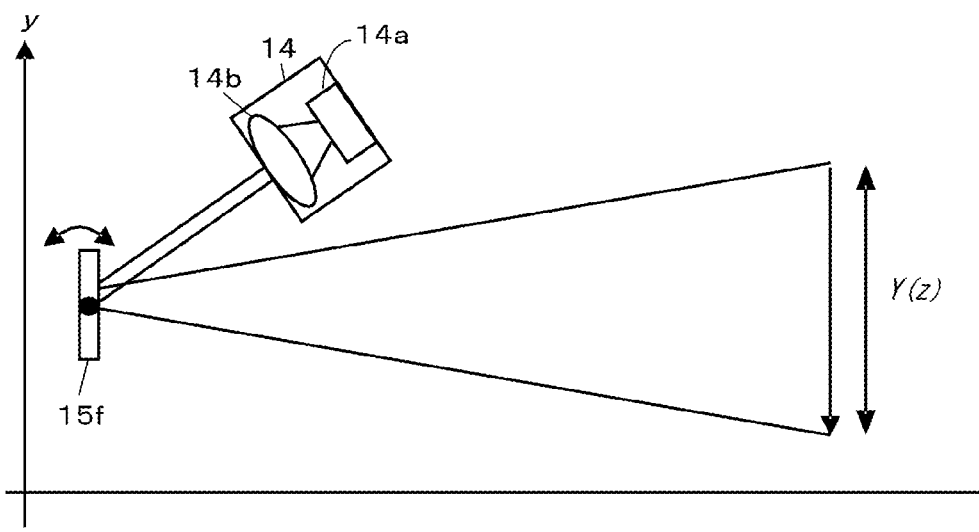
FIG. 12B is a diagram illustrating another cross section of the configuration of the optical system.

Next, in the fifth example shown in FIG. 12A and FIG. 12B, the structure of the laser light source 14 is the same as that in the first example. The irradiation optical system 15 has a scanning mirror 15f which sways along the respective x-axis and y-axis directions. Note that the figure shows only a single scanning mirror 15f, however, the function of the mirror may be realized with plural mirrors.

The laser beam outputted from the laser light source 14 is deflected by the scanning mirror 15f to scan a region where the guide mark 42 is to be formed. At the same time, the laser light source 14 is controlled such that the laser light source 14 is turned on at the timings when the irradiation position of the laser beam arrives at a position P to form the respective bars of the guide mark 42, and turned off at other timings.

Further, the scanning with the scanning mirror 15f is performed at a high speed in the x-axis direction and at a low speed in the y-axis direction such that the y-axis direction position advances for one dot during one-line scanning with the laser beam in the x-axis direction. The scan speed is arbitrarily determined as long as the bar type mark is recognizable with the dots continuing in the y-axis direction.

Figure 12C:
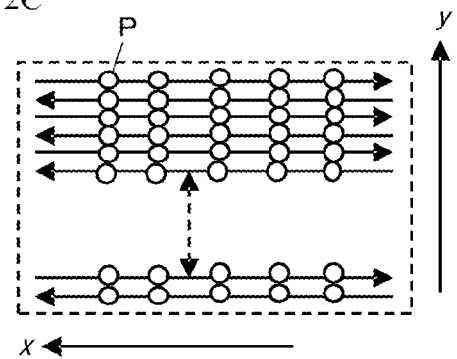
FIG. 12C is a diagram illustrating an example of the guide mark formed with the optical system of the fifth example.

According to the above-described optical system, it is possible to form the guide mark with bars arrayed at predetermined intervals as shown in FIG. 12C. That is, it is possible to form the guide mark 42 as shown in FIG. 7.

Figure 13:
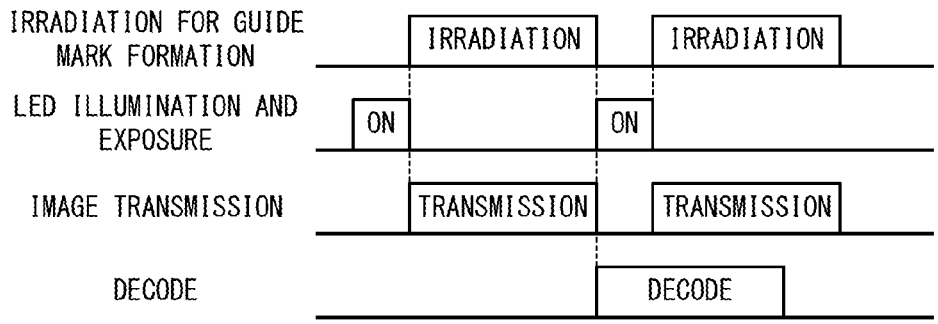
FIG. 13 is a diagram illustrating an example of operation timings of the respective elements of the code symbol reading device shown in FIG. 1.

Next, the irradiation timing for formation of the above-described guide mark will be described. FIG. 13 shows an example of operation timings of the respective parts of the code symbol reading device.

When a code symbol reading has been instructed, the code symbol reading device 100 first turns on the pulse LED 13 to emit illumination light while causing the image pickup sensor 11 to perform exposure to acquire an image, as shown in FIG. 13. At this timing, when the irradiation is performed for guide mark formation, the mark is included in the acquired image, which disturbs decoding. Accordingly, irradiation for guide mark formation is not performed.

Thereafter, when the image pickup with the image pickup sensor 11 is completed, the image pickup sensor 11 transfers the result of the image pickup as image data to the decoder 20. It takes predetermined time. During this period, since it is wasteful to turn on the pulse LED 13 since image pickup is not performed, it is turned off On the other hand, during the transfer, the irradiation for guide mark formation does not disturb the image pickup. Accordingly, the code symbol reading device 100 turns on the laser light source 14 to perform irradiation for guide mark formation. When the transfer of the image data has been completed, the irradiation is stopped before the start of the next image pickup.

Then, during the next image pickup, the irradiation for guide mark formation is stopped, and after the completion of the image pickup, the irradiation is started again. Thereafter this operation is repeated until decoding is successfully performed.

Further, when the image data transfer has been completed, the decoder 20 analyzes the image data and performs decoding on the code symbol. The timing of the decoding is not particularly related to irradiation and non-irradiation for guide mark formation.

As described above, it is possible to prevent adverse effects on the decoding by stopping irradiation for guide mark formation during the image pickup with the image pickup sensor 11. Note that since it takes predetermined time for image data transfer, even if irradiation for guide mark formation is performed only during this period, the user can sufficiently recognize the guide mark.

Next, processing upon code symbol reading performed by the CPU 21 of the code symbol reading device 100 will be described.

Figure 14:
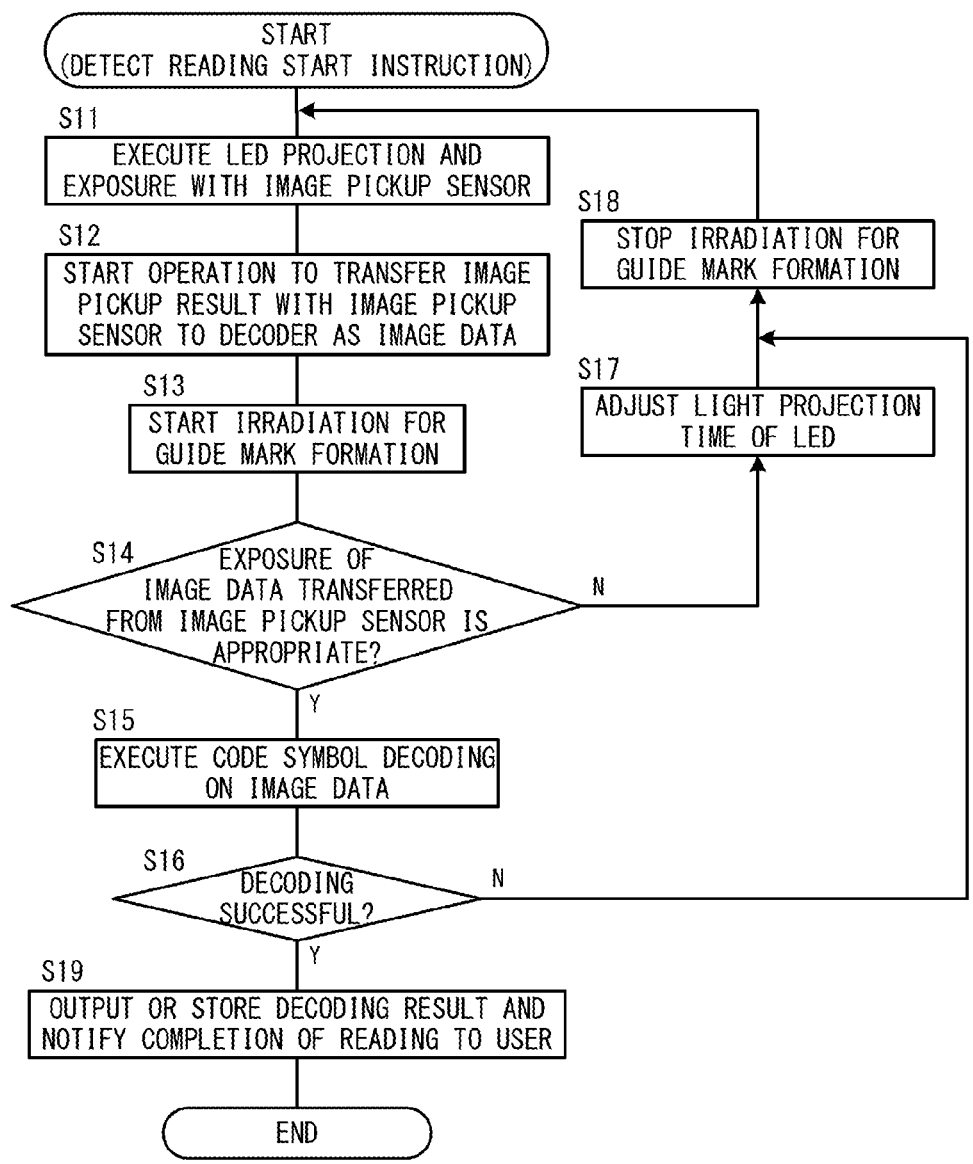
FIG. 14 is a flowchart showing an example of processing executed by the code symbol reading device shown in FIG. 1.

FIG. 14 shows a flowchart of the processing.

The CPU 21 starts the processing shown in the flowchart of FIG. 14 upon detecting an instruction to start code symbol reading by operation of the operation unit 31 or the like.

First, the CPU 21 turns on the pulse LED 13 to emit illumination light, and controls the image pickup sensor 11 to perform exposure (S11). The time for emission of the illumination light and exposure is respectively determined in advance. The time may be automatically set by referring to a previously-stored table based on ambient light quantity or distance to the subject to be read 40.

Next, the CPU 21 controls the image pickup sensor 11 to start the operation of transferring the result of image pickup, as image data, to the decoder 20 (S12). Thereafter, the CPU 21 turns on the laser light source 14 to start irradiation for guide mark formation (S13).

Next, the CPU 21 analyzes the image data transferred from the image pickup sensor 11, to determine whether or not the exposure is appropriate (S14). That is, the CPU 21 determines whether or not the entire brightness level is too high or too low.

If it is determined that the brightness level is appropriate, the CPU 21 employs the image data for decoding, and performs decoding of the code symbol (S15). When the decoding is successful (YES at S16), the CPU 21 outputs the result of the decoding to an external device or stores the result in the RAM 23, and notifies the user of the completion of decoding of the code symbol (S19). Then the CPU 21 ends the processing.

The handling of the result of decoding is set in advance. Further, the notification of the completion of reading is performed by the notification unit 32 by buzzer sounding or turning on of a lamp.

On the other hand, when NO at step S14, the CPU 21 adjusts the lighting time of the pulse LED 13 in accordance with the detected brightness level (S17). Thereafter, the CPU 21 turns off the laser light source 14 to stop irradiation for guide mark formation (S18), then returns to step S11 to again perform image pickup. At this time, the lighting time of the pulse LED 13 is a value after the adjustment at step S17.

Further, when NO at step S16, as the exposure is appropriate, the CPU 21 proceeds to step S18 without adjusting the lighting time, to perform the subsequent processing.

By the above-described processing, the CPU 21 controls the optical unit 10 to perform image pickup and irradiation for guide mark formation at the timings explained using FIG. 13, and performs decoding of the code symbol.

When the processing of FIG. 14 is adopted, the user refers to the guide mark formed on the subject to be read 40 by the irradiation, and compares the interval between the guide marks and the size of the elements in the code symbol by visual observation. Then when the interval between the guide marks is too wide (a predetermined number or more of previously-determined (e.g. black) elements exist between adjacent guide marks), the user determines that the image pickup resolution of the image pickup sensor 11 is not sufficient. That is, the user recognizes that the code symbol reading device 100 is too far away from the subject to be read 40 and an image clear enough for decoding with regard to the code symbol 41 is not acquired. Then, the user ensures a decodable status by moving the code symbol reading device 100 closer to the subject to be read 40.

It is possible to automatically perform the recognition of the distance between the code symbol reading device 100 and the subject to be read 40.

Figure 15:
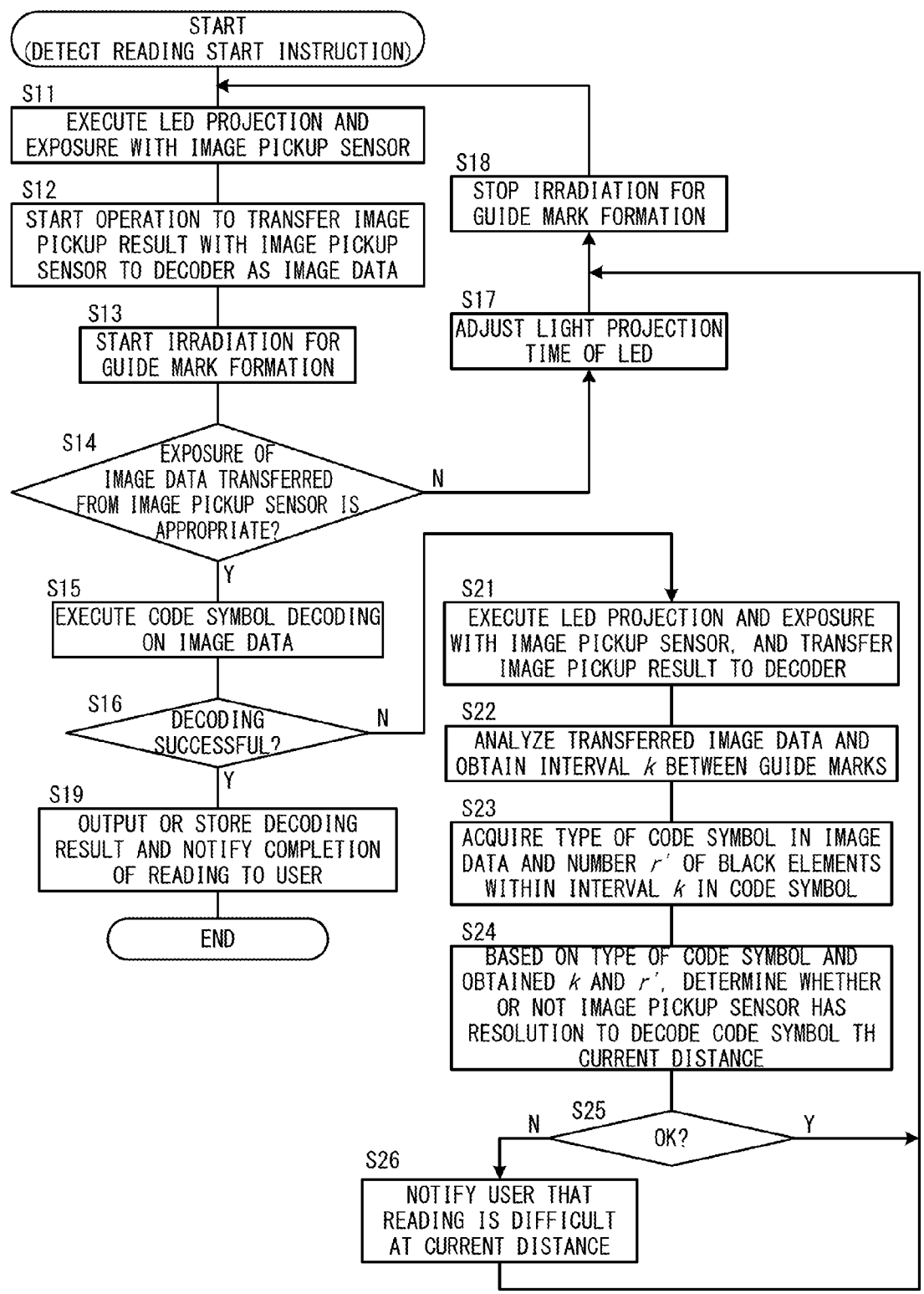
FIG. 15 is a flowchart showing another example of the processing.

FIG. 15 shows an example of processing performed by the CPU 21 in this case.

In the processing in FIG. 15, steps S21 to S26 are added to the processing in FIG. 14. Since steps S11 to S19 are the same as those in FIG. 14, explanations of these steps will be omitted.

In the processing of FIG. 15, when NO at step S16, the CPU 21 proceeds to step S21 in place of step S18.

Then as in the case of steps S11 and S12, the CPU 21 turns on the pulse LED 13, performs exposure with the image pickup sensor 11, and transfers the result of image pickup to the decoder 20 (S21). The image pickup here is performed while the irradiation for guide mark formation is continued. The other conditions are the same as those at step S11.

Next, the CPU 21 analyzes the transferred image data, and acquires the interval k between the adjacent marks in the guide mark (S22). The interval may be measured by the number of pixels. Further, the interval is preferably measured in several positions so as to obtain a mean value.

Further, the CPU 21 analyzes the transferred image data, and thereby acquires the type of code symbol included in the image data and the number r' of black elements in the interval k in the code symbol (S23). As described in the explanation of Table 1, even when elements in different sizes exist, the CPU 21 has only to count the number of the elements. Further, it may be arranged such that the CPU 21 counts the number of elements in a region several-fold wider than k and divides the number by the multiple so as to obtain a mean value of r'.

Since the determination at step S16 is NO, it is considered that decoding is impossible even when image pickup is performed again if the user has not moved the code symbol reading device 100. However, in this status, in some cases, it is possible to determine the type of the code symbol based on characteristic portions thereof and to count the number of elements. When the determination and counting are impossible, the result at step S23 is "unknown".

Next, the CPU 21 determines whether or not the image pickup sensor 11 has a resolution to decode the code symbol at the current distance, based on the type of the code symbol, the number r' of black elements obtained at step S23 and the interval k obtained at step S22 (S24).

This determination is performed using the constant t previously stored in correspondence with the type of code symbol and the constant q indicating the decoding performance such that when q>k/r'×t holds, it is determined that the resolution is sufficiently high.

The meanings of t and q are as described above using Formula 9 and Formula 10. It is preferably arranged such that values corresponding to some types of code symbol as shown in Table 1 and Table 2 are previously stored in the ROM 22, and the values are used at step S24. Regarding the value of q, since it may vary in accordance with surrounding environment, it may be manually adjusted by the user.

In any case when the CPU 21 determines as a result of determination at step S24 that the resolution is not sufficient (NO at S25), the CPU 21 notifies the user with the notification unit 32 that it is difficult to read the code symbol at the current distance (S26), thereafter proceeds to step S18 and the subsequent processing. The notification is performed by e.g. buzzer sounding or turning on of a lamp. However, the notification is performed distinguishably from the notification at step S19.

Note that it may be arranged such that when data necessary for the determination at step S24 is not acquired, the CPU 21 determines that the resolution is not sufficient. This is because it can be determined that the determination of type of code symbol and the counting of the number of elements could not be performed because of the extremely low resolution.

Further, when the CPU 21 determines that the resolution is sufficiently high, the CPU 21 proceeds to step S18 and the subsequent processing.

In the above-described processing of FIG. 15, the CPU 21 functions as a determiner at step S24.

By performing the above-described processing, the user can easily grasp the situation that the reading is impossible due to the distance between the code symbol reading device 100 and the subject to be read 40 by notification at step S26. Then by adjusting the position of the code symbol reading device 100 in response to the notification, the user can enable the device to decode the code symbol.

When YES at step S25, it is considered that the resolution is sufficient but overlay status of the pixels on the code symbol is poor and thus the elements are not appropriately recognized. In this case, when the image pickup is repeated on the same conditions, the positional relation between the code symbol and the pixels changes due to sway of the hand. Accordingly, a decodable image is acquired in due time.

Note that regarding the processing in FIG. 15, the type of code symbol is also automatically determined. However, when the code symbol to be read is previously determined, the processing at steps S23 and S24 may be performed based on the type of the code symbol. The type of code symbol to be read may be selected by the user.

Further, in the processing in FIG. 15, the number of black elements is counted, however, the number of white elements may be counted. When other elements than these elements exist, the number of the other elements may be counted. In these cases, as the constant t at step S24, a constant indicating a mean value of the number of the counted type of elements per minimum element width is used.

The description of the embodiment has been made as above. It is apparent that the device configuration, the types of code symbols to be read, the shape of guide mark, the particular steps of processings and the like are not limited to those described in the above embodiment.

For example, it may be arranged such that a characteristic point is provided in the guide mark, and based on the position of the characteristic point in the image obtained by image pickup on the guide mark, the distance between the code symbol reading device 100 and the subject to be read 40 is measured.

Figure 16A:
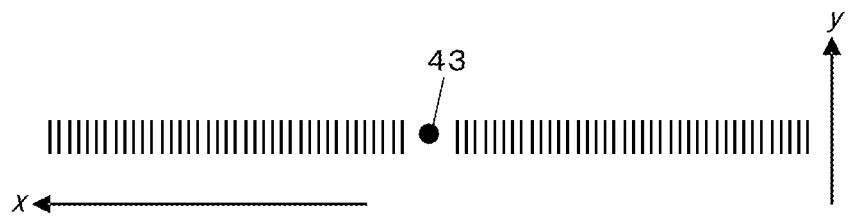
FIG. 16A is a diagram illustrating an example of the guide mark including a characteristic point.
Figure 16B:
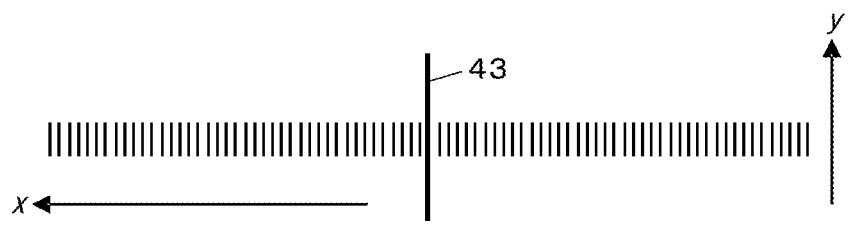
FIG. 16B is a diagram illustrating another example of the guide mark including the characteristic point.

FIG. 16A and FIG. 16B show respectively different examples of the guide mark in this case. In each example, numeral 43 denotes a mark indicating the characteristic point. A part of plural marks forming the guide mark arrayed at equal intervals may be removed and the mark 43 may be formed and added to the removed part, otherwise, the mark 43 may be simply added.

The dot type mark as shown in FIG. 16A may be used, or the bar type mark as shown in FIG. 16B may be used. In the case of the bar type mark, the actual position of the characteristic point may be the center or end of the mark. In any case, it may be previously determined and set in the code symbol reading device 100.

Then, by obtaining the image of the guide mark formed on the subject to be read 40, it is possible to measure the distance between the code symbol reading device 100 (more exactly the lens 12) and the subject to be read 40 by parallax method based on the position of the characteristic point in the image.

Figure 17:
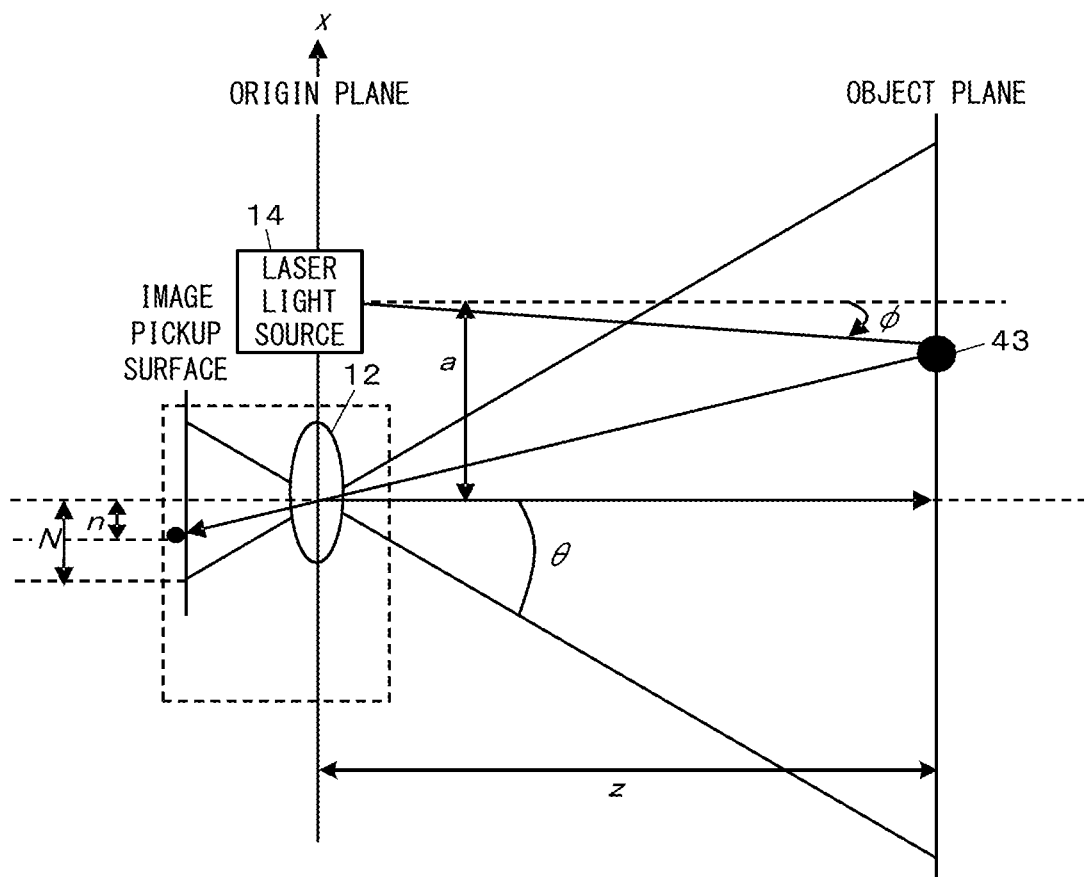
FIG. 17 is an explanatory diagram of parameters necessary for calculation of a distance to the subject to be read.
Figure 18:
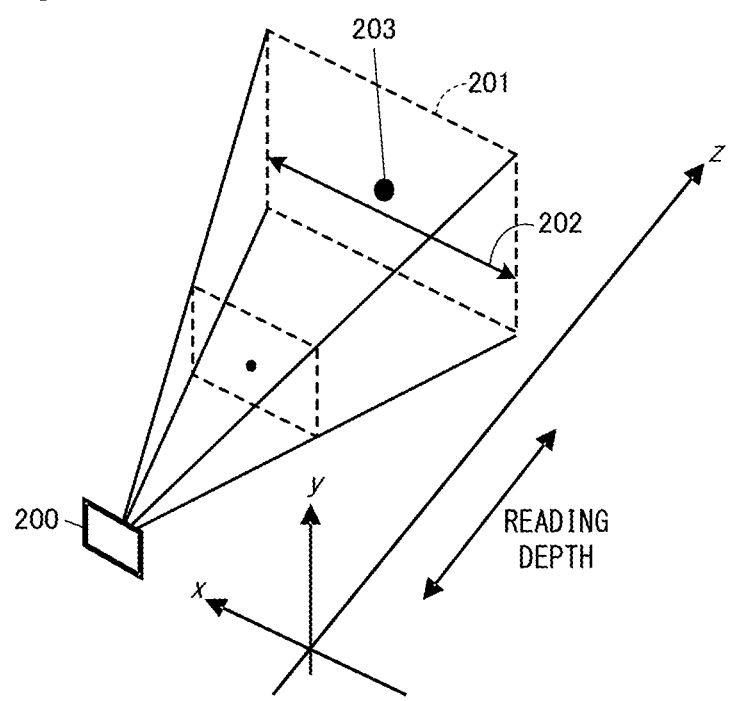
FIG. 18 is a diagram for explaining a conventional aiming mark.

FIG. 17 is an explanatory diagram of parameters necessary for calculation of the distance to the subject to be read.

The distance z to the subject to be read 40 can be calculated based on the following parameters in the figure and the following Formula 14.

z: distance from a principal point of the lens 12 to the subject to be read
a: distance from the principal point of the lens 12 to an emitting position (center thereof) of a mark indicating the characteristic point in the laser light source 14, measured in a direction parallel with an image area of the image pickup sensor 11 (design value)
θ: half view angle of the image pickup sensor 11 (design value)
N: the number of pixels of the image pickup sensor 11 within a range corresponding to the half view angle (e.g., ½ of the total number of pixels in the x-axis direction, design value)
n: distance from the center of the image area of the image pickup sensor 11 to a pixel where the characteristic point is imprinted (the number of pixels in the x-axis direction)
φ: angle between the optical axis of laser light forming the mark indicating the characteristic point and the optical axis of the lens 12 (downward direction in the figure is positive direction, design value)

{Math. 2}

$$z(n) = \frac{a}{\frac{n}{N}\tan\theta + \tan\phi} \quad \text{(Formula 14)}$$

As described above, by measuring the distance to the subject to be read 40, it is possible to set the lighting time of the pulse LED 13 and the exposure time of the image pickup sensor 11 based on the distance, to thereby reduce retry of image pickup due to insufficient exposure, and reduce time for successful decoding.

Further, in addition to the above, the optical system for formation of guide mark is not limited to those shown in FIG. 8A to FIG. 12C. Further, the means for forming the guide mark is not limited to the radially-diffused light beam.

Regarding the range of formation of the guide mark, the range may be formed approximately in correspondence with the possible image pickup range of the image pickup sensor 11, i.e., the code symbol readable range. With this arrangement, the guide mark may also be used as a mark indicating the readable range. However, the present invention is not limited to this arrangement. Only several pitches (several marks) may be formed around the center. In this case, a mark indicating the readable range may be additionally formed. The value of M may be determined in correspondence with not the number of elements in the code symbol but with this purpose.

Further, when the guide mark 42 is formed using e.g. the optical system shown in FIG. 12A and FIG. 12B, M and ψ may be dynamically changed. In this case, the designation of standard of code symbol to be read is received, then k and ψ are calculated again using the values of t, q and M corresponding to the designated standard, and the guide mark 42 compliant to the designated standard is formed.

Further, as described above, the value of q varies in accordance with environment. Further, it may be arranged such that a value indicating the environment is detected by a sensor, and k and ψ are calculated again as needed based on the value of q obtained based on the result of the detection. In this manner, it is possible to form the guide mark 42 which always appropriately indicates the image pickup resolution of the image pickup sensor 11 regardless of change of environment.

Further, the optical information reading device according to the present invention may be configured as a stationary type device or hand-held type device. The subject to be read is not limited to a code symbol but may be a character and symbol other than the code symbol.

Further, the structures and modifications described above may be individually applied or appropriately combined and applied within a consistent range.

INDUSTRIAL APPLICABILITY

According to the above-described optical information reading device, it is possible to enable a user to easily grasp whether or not a subject to be read is within a reading depth of the optical information reading device. In particular, it is possible to easily grasp whether or not the subject is in a position away from the reading depth.

REFERENCE SIGNS LIST

10 . . . optical unit, 11 . . . image pickup sensor, 12 . . . lens, 13 . . . pulse LED, 14 . . . laser light source, 14a . . . laser device, 14*b* . . . collimating lens, 14*c* . . . lens, 15 . . . irradiation optical system, 15*a* . . . diffraction optical element, 15*b* . . . refractive optical element, 15*c* . . . concave mirror, 15*d* . . . mirror group, 15*e* . . . light shielding plate, 15*f* . . . scanning mirror, 20 . . . decoder, 21 . . . CPU, 22 . . . ROM, 23 . . . RAM, 24 . . . communication I/F, 31 . . . operation unit, 32 . . . notification unit, 40 . . . subject to be read, 41 . . . code symbol, 42 . . . guide mark, 43 . . . characteristic point, 100 . . . code symbol reading device, 200 . . . reader, 201 to 203 . . . mark.

The invention claimed is:

1. An optical information reading device configured to read optical information on a subject to be read by acquiring an image of the subject to be read with an image pickup portion and analyzing the image, comprising:

an irradiator configured to irradiate the subject to be read to form a guide mark indicating an image pickup resolution for a plurality of pixels of the image pickup portion.

2. The optical information reading device according to claim 1, wherein the irradiator is configured to emit a plurality of radially diffused light beams so as to form the guide mark at equal intervals on the subject to be read.

3. The optical information reading device according to claim 2, wherein, for k for which $10 \leq k \leq 30$ holds, an interval between adjacent guide marks among the plurality of guide marks corresponds to a resolution for k pixels of the image pickup portion.

4. The optical information reading device according to claim 2, wherein, assuming that r is a number equal to or greater than 1, an interval between adjacent guide marks among the plurality of guide marks is used for determination that it is possible to read the optical information when an average number of a specific type of elements in the optical information positioned between the adjacent guide marks is equal to or smaller than r.

5. The optical information reading device according to claim 4, wherein $r \leq 8$ holds.

6. The optical information reading device according to claim 1, wherein the irradiator is configured to stop the irradiation to form the guide mark at image pickup timing by the image pickup portion.

7. The optical information reading device according to claim 1, wherein the plurality of guide marks are a plurality of bar type guide marks, a plurality of dot type guide marks, or a combination of the plurality of bar type guide marks and dot type guide marks.

8. The optical information reading device according to claim 4, further comprising a determiner configured to acquire an image of the guide mark formed by the irradiator on the subject to be read, with the image pickup portion, and determine whether or not reading of the optical information is possible based on a type of the optical information of a predetermined subject to be read and the number of the specific type of elements of the optical information positioned between adjacent guide marks in the acquired image.

9. The optical information reading device according to claim 1, wherein the irradiator is configured to irradiate the subject to be read to form, in addition to the guide mark, a position detection mark, and wherein the optical information reading device further comprising a distance measuring portion configured to acquire an image of the position detection mark formed by the irradiator on the subject to be read, with the image pickup portion, and measure a distance from the image pickup portion to the subject to be read based on a position of the position detection mark in the acquired image.

* * * * *